United States Patent
Krausz et al.

(10) Patent No.: US 11,199,496 B2
(45) Date of Patent: Dec. 14, 2021

(54) METHODS AND DEVICES FOR MEASURING CHANGES IN THE POLARIZATION RESPONSE OF A SAMPLE BY FIELD-RESOLVED VIBRATIONAL SPECTROSCOPY

(71) Applicants: Max-Planck-Gesellschaft zur Foerderung der Wissenschaften e.V., Munich (DE); Ludwig-Maximilians-Universitaet Muenchen, Munich (DE)

(72) Inventors: Ferenc Krausz, Garching (DE); Hanieh Fattahi, Munich (DE); Marinus Huber, Munich (DE); Joachim Pupeza, Tuerkenfeld (DE); Mihaela Zigman Kohlmaier, Munich (DE)

(73) Assignees: Max-Planck-Gesellschaft zur Foerderung der Wissenschaften e.V., Munich (DE); Ludwig-Maximilians-Universitaet Muenchen, Munich (DE)

( * ) Notice: Subject to any disclaimer, the term of this patent is extended or adjusted under 35 U.S.C. 154(b) by 0 days.

(21) Appl. No.: 16/496,270

(22) PCT Filed: Mar. 21, 2017

(86) PCT No.: PCT/EP2017/056705
§ 371 (c)(1),
(2) Date: Sep. 20, 2019

(87) PCT Pub. No.: WO2018/171869
PCT Pub. Date: Sep. 27, 2018

(65) Prior Publication Data
US 2020/0033259 A1 Jan. 30, 2020

(51) Int. Cl.
*G01N 21/21* (2006.01)
*G01N 21/3586* (2014.01)
(Continued)

(52) U.S. Cl.
CPC ....... *G01N 21/3586* (2013.01); *G01B 9/0201* (2013.01); *G01N 21/21* (2013.01); *G01N 21/45* (2013.01); *G01N 2021/655* (2013.01)

(58) Field of Classification Search
CPC .... G01N 21/3586; G01N 21/21; G01N 21/45; G01N 2021/655; G01B 9/0201; G01B 9/02011; G01B 9/02012; G01B 2290/70
See application file for complete search history.

(56) References Cited

U.S. PATENT DOCUMENTS 7,667,848 B2 2/2010 Lee et al.
9,594,023 B2 3/2017 Tamada
(Continued)

FOREIGN PATENT DOCUMENTS

JP 201388244 A 5/2013
JP 2016173561 A 9/2016
(Continued)

OTHER PUBLICATIONS

Bauer et al., "Mode-locked Yb:YAG thin-disk oscillator with 41 uJ pulse energy at 145 W average infrared power and high power frequency conversion", Optics Express, vol. 20, No. 9, pp. 9698-9704 (2012).
(Continued)

*Primary Examiner* — Jonathan M Hansen
(74) *Attorney, Agent, or Firm* — Caesar Rivise, PC

(57) ABSTRACT

A method of measuring a polarization response of a sample (1), in particular a biological sample, comprises the steps of generating a sequence of excitation waves (2), irradiating the sample (1) with the sequence of excitation waves (2),
(Continued)

including an interaction of the excitation waves (2) with the sample (1), so that a sequence of sample waves (3) is generated each including a superposition of a sample main pulse and a sample global molecular fingerprint (GMF) wave ($E_{GMF(sample)}(t)$), irradiating a reference sample (1A) with the sequence of excitation waves (2), including an interaction of the excitation waves (2) with the reference sample (1A), so that a sequence of reference waves (3A) is generated each including a superposition of a reference main pulse and a reference GMF wave ($E_{GMF(ref)}(t)$), optically separating a difference of the sample waves (3) and reference waves (3A) from GMF wave contributions which are common to both of the sample waves (3) and reference waves (3A) in space and/or time, and detecting the difference of the sample waves (3) and the reference waves (3A) and determining a temporal amplitude of differential molecular fingerprint (dMF) waves ($\Delta E_{GMF}$) (4) each comprising the difference of the sample and reference GMF waves. Furthermore, as a spectroscopic apparatus for measuring a polarization response of a sample (1) is described.

42 Claims, 6 Drawing Sheets

(51) Int. Cl.
*G01N 21/45* (2006.01)
*G01B 9/02* (2006.01)
*G01N 21/65* (2006.01)

(56) References Cited

U.S. PATENT DOCUMENTS

| | | | |
|---|---|---|---|
| 10,345,224 | B2 | 7/2019 | Nawata et al. |
| 2005/0168735 | A1* | 8/2005 | Boppart ............. G01N 21/4795 356/301 |
| 2008/0304046 | A1* | 12/2008 | Lee .................... G01N 21/636 356/51 |
| 2013/0094025 | A1 | 4/2013 | Nishida et al. |
| 2015/0097118 | A1 | 4/2015 | Zheng et al. |
| 2016/0274306 | A1 | 9/2016 | Yukawa |

FOREIGN PATENT DOCUMENTS

| | | |
|---|---|---|
| KR | 10-0860947 B1 | 9/2008 |
| WO | 2013084621 A1 | 4/2015 |
| WO | 2016102056 A1 | 6/2016 |
| WO | 2016056522 A1 | 8/2017 |

OTHER PUBLICATIONS

Brons et al., "Powerful 100-fs-scale Kerr-lens mode-locked thin-disk oscillator", Optics Letters, vol. 41, No. 15, pp. 3567-3570 (2016).
Fattahi et al., "Near-PHz-bandwidth, phase-stable continua generated from a Yb:YAG thin-disk amplifier", Optics Express, vol. 24, No. 21, pp. 24337-24346 (2016).
Freudiger et al., "Label-Free Biomedical Imaging with High Sensitivity by Stimulated Raman Scattering Microscopy", Science, Vo. 322, pp. 1857-1861 (2008).
Geyer et al., "Plasma Proteome Profiling to Assess Human Health and Disease", Cell Systems 2, pp. 185-195 (2016).
Johnson et al., "Enhanced depth resolution in terahertz imaging using phase-shift interferometry", Applied Physics Letters, vol. 78, No. 6, pp. 835-837 (2001).
Keiber et al., "Electro-optic sampling of near-infrared waveforms", Nature Photonics, vol. 10, pp. 159-163 (2016).
Krishnamurthy et al., "Characterization of thin polymer films using terahertz time-domain interferometry", Applied Physics Letters, vol. 79, No. 6, pp. 875-877 (2001).
Kukura et al., "Femtosecond Stimulated Raman Spectroscopy", Annu. Rev. Phys. Chem., vol. 58, pp. 461-488 (2007).
Lanin et al., "Time-domain spectroscopy in the mid-infrared", Scientific Reports, vol. 4, (8 pages) (2014).
Laubereau et al., "Vibrational dynamics of liquids and solids investigated by picosecond light pulses", Reviews of Modern Physics, vol. 50, No. 3, pp. 607-665 (1978).
Liu et al., "Sensing minute changes in biological cell monolayers with THz differential time-domain spectroscopy", Biosensorsand Bioelectronics, pp. 1075-1080 (2007).
McCamant et al., "Femtosecond broadband stimulated Raman spectroscopy: Apparatus and methods", Rev. Sci. Instrum., vol. 75, No. 11, pp. 4971-4980 (2004).
Pronin et al., "High-power multi-megahertz sources of waveform-stabilized few-cycle light", Nature Communications, 6:6998 (2015).
Pupeza et al., "High-power sub-two-cycle mid-infrared pulses at 100 MHz repetition rate", Nature Photonics, vol. 9, pp. 721-725 (2015).
Sommer et al., "Attosecond nonlinear polarization and light-matter energy transfer in solids", Nature, vol. 534, pp. 36-90 (2016).
Tauber et al., "Flowing liquid sample jet for resonance Raman and ultrafast optical spectroscopy", Review of Scientific Instruments, vol. 74, No. 11, pp. 4958-4960 (2003).
Korean Office Action dated Dec. 18, 2020 with English Language Translation.
Japanese Office Action dated Nov. 24, 2020 with English Language Translation.

* cited by examiner

METHODS AND DEVICES FOR MEASURING CHANGES IN THE POLARIZATION RESPONSE OF A SAMPLE BY FIELD-RESOLVED VIBRATIONAL SPECTROSCOPY

CROSS-REFERENCE TO RELATED APPLICATIONS

This application is a U.S. National Phase Application of PCT/EP2017/056705, filed Mar. 21, 2017, the contents of which application are incorporated herein by reference in their entireties for all purposes.

FIELD OF THE INVENTION

The invention relates to a method of measuring the polarization response of a sample to optical field excitation, in particular the vibrational response of molecules of a biological sample, and changes of the polarization response. The polarization response of the sample is measured by field-resolved spectroscopy, via directly sampling the rapidly oscillating electric field radiated by the induced sample polarization in the time domain. Furthermore, the invention relates to a spectroscopic apparatus for measuring the polarization response of a sample, in particular a biological sample. Applications of the invention include detection of changes in the physical and chemical properties/conditions of a sample, in particular changes in the molecular composition of biological samples. Possible biological samples include gaseous-, liquid- or solid-phase samples from a human or animal organism, in particular body fluids, tissues as well as individual cells from living organisms.

TECHNICAL BACKGROUND

Molecules are the smallest functional building blocks of living organisms. Living systems require the presence of an enormous variety of molecules. Their abundance is allowed to vary within a narrow range for an organism to function properly. Cells or blood, as prominent examples, are composed of tens of thousands of different molecules, the concentration of which depends on the physiological state of the body. Substantial changes in the abundance of individual molecular constituents of blood can thus serve as indicators of abnormal physiology. Such changes are used as a basis for molecular pathology for detection and subsequent monitoring of progression of disease, its response and resistance to treatment, and for assessing the susceptibility of individuals to particular disorders. Moreover, differences in molecular composition of different types of cells may be helpful in identifying cell types (such as e.g. stem cells) and sorting cells from one and the same organism.

The molecules with largest relative changes in concentration (incl. newly appeared ones) lend themselves as markers of a disease or to distinguishing different types of cells from each other. A tiny fraction of them can be identified individually by antibody-based assays. The conventional techniques for sensing a large number of molecules simultaneously are e.g. RNA sequencing and mass spectrometry (detecting individual constituents) and vibrational spectroscopy (measuring global effects from a multitude of specimen). These techniques are mainly sensitive to high-abundance constituents, which dominate their observed signals, and they are "blind" for a large number of low-abundance molecules. However, changes in the concentration of low-abundance molecules can also be of high importance, a prominent example being e.g. cytokines, even miniscule concentration change of which is known to lead to extensive physiological effects. Low-abundance molecules may well incorporate several of possibly many different ones with large relative changes in concentration caused by abnormal physiology. Hence, they might—particularly in correlation—be ideally suited for either disease marking or cell identification/sorting. All these potential molecular markers have been inaccessible to molecular pathology and cell biology to date. In conclusion, a persisting major challenge in molecular pathology and cell biology to date is the identification of smallest concentration changes of high- as well as low-abundance molecules in complex mixtures.

Vibrational spectroscopy acquires information related to the polarization response of molecular specimens induced by periodic oscillations of the atomic nuclei around their equilibrium positions. For decades, infrared spectroscopy and Raman spectroscopy (described below) have been used to acquire the amplitude response of molecular vibrations over an ever broader spectral range. The corresponding specimen-characteristic information is customarily referred to as vibrational molecular fingerprint, briefly: molecular fingerprint. Note that in literature this designation has also been used in the context of other physical observables, albeit always with the aim of associating a unique fingerprint (also called: spectral polarization response) to a specific sample. Despite of a plurality of measuring techniques, conventional fingerprinting methods suffer from a moderate sensitivity, preventing the reliable detection of small changes in molecular composition of samples and that of low-abundance constituents altogether.

Traditionally, molecular fingerprints are measured in the frequency domain, either by autocorrelation (Fourier-transform spectroscopy, FTS) or using monochromator/spectrometer arrangements, acquiring (indirectly or directly) spectral intensities. The specific signature of a sample manifests itself in changes of these intensities when placing the sample in the beam path. This brings about two severe limitations: first, intensity noise of the source compromises the ability of the approach/device to detect intensity changes that are induced by the sample. Second, the high intensity on top of which small changes are to be resolved calls for a high dynamic range, the necessarily finite value of which sets a limit to power scaling. Both effects contribute to restricting the smallest detectable changes in sample properties/conditions.

Most recently, a major progress in the detection limit of infrared absorption spectroscopy has been achieved. It is based on a sudden (preferably femtosecond-duration) excitation of molecular vibrations (or more generally: structural dynamics) and direct time-domain sampling of the rapidly oscillating electric field emitted by the induced polarization response in the wake of the sudden excitation. This field sampling acquires both the strength of the excited vibrations (amplitude response) as well as their retardation with which they react to an external trigger (phase response) and has been referred to as field-resolved spectroscopy (FRS). This scheme, described in WO 2016/102056 A1, substantially improves the sensitivity in the detection of small changes in the properties/conditions of a sample, in particular in specimen concentration in biological samples, however still suffers from the shortcoming of delivering a signal that is dominated by contributions from high-abundance constituents and, in addition, its sensitivity is still compromised by an ultraintense excitation pulse entering the detector before the molecular signal. In what follows, the physical principles underlying FRS are reviewed, highlighting its advantages beneficial for, and its limitations overcome by the present invention.

Physical Principles Underlying FRS

Measuring the polarization response with FRS according to WO 2016/102056 A1 is based upon the synchronism (or: coherence) with which molecules of the sample 1 under investigation (FIG. 11, prior art) emit light waves when excited by coherent light excitation waves 2, the field oscillations of which are perfectly synchronized in space and time. As a consequence, the emission from individual molecules of the same type i add constructively, resulting in a wave with an electric field $E_i(t)$ the strength of which increases with the number of emitters, $N_i$. The entire wave, radiated by all the molecules of the sample 1 is the superposition of all of these partial waves, carrying what is referred to as the global molecular fingerprint (GMF) of the sample, in the form of the temporal variation of its electric field, $E_{GMF}(t)$. The attribute "global" stresses the fact that the GMF of the sample 1 carries, in principle, information from all of the molecules in contrast to, e.g., a targeted search for biomarkers (see, e.g., P. E. Geyer et al. in "Cell Syst." 2, 185 (2016)), restricted to a small subset of the constituents of the sample.

Exciting the molecules impulsively with the sudden, ultrashort excitation wave 2 (FIG. 11, see also A. Sommer et al. in "Nature" 534, 86 (2016)) that is much briefer than the lifetime of molecular excitations will result in an electric field emanating from the sample (sample wave 3) consisting of two parts: the excitation laser pulse, modified by the sample's instantaneous polarization response (henceforth referred to as main pulse 2') and a (much weaker) trailing part arising from the sample's non-instantaneous polarization response, often referred to as the free-induction decay (FID), cf. Lanin et al. in "Nature Scientific Reports" 4, 6670 (2014) and Lauberau and Kaiser in "Rev. Mod. Phys." 50, 607 (1978), also illustrated in FIG. 11.

In the case of a biological sample the FID signal carries the GMF of the sample, which we henceforth refer to as the GMF wave (or: GMF signal). If the duration of the main pulse 2' is substantially shorter than that of the GMF signal, a direct time-domain measurement of the latter exhibits a fundamental advantage over (continuous-wave) frequency-domain spectroscopy techniques: the GMF signal can be accessed in a background-free manner owing to the main pulse 2' decaying exponentially in time after its peak on a much shorter scale than the duration of the GMF signal.

This allows measurements of very weak signals generated by low-concentration specimens, e.g. improved sensitivity. In sharp contrast to frequency-domain implementation of vibrational spectroscopies, the intensity noise of the radiation source doesn't constitute a limitation to the minimum detectable GMF signal owing to its temporal separation from the excitation. However, the intensity noise of the source translates to relative amplitude noise of the GMF signal, setting a limit to the minimum detectable change in concentration of the molecular constituents contributing to the GMF signal.

Technical Implementation—Prior Art

Measuring the sample wave 3 is conducted with the spectroscopic apparatus 100 of FIG. 12 as disclosed in WO 2016/102056 A1. Driving pulses from a laser pulse source 10, e.g. a femtosecond laser as described by O. Pronin et al. in "Nature Commun." 6, 6988, 2015, are used for creating the excitation pulses 2 as described by I. Pupeza et al. in "Nature Photon." 9, 721 (2015), irradiating the sample 1 under investigation, and for providing sampling pulses 5 for electro-optic sampling of the sample wave 3 with an electro-optic detector device 20. Electro-optic sampling can directly measure $E_{GMF}(t)$ in excess of 200 THz (see S. Keiber et al. in "Nature Photonics" 10, p. 159, 2016). The excitation pulses 2 are created e.g. in a nonlinear crystal (like a $LiGaS_2$ crystal) based on intra-pulse difference-frequency generation. The temporal amplitude function of the sample wave 3 is subjected to a Fourier transformation directly yielding the spectral response of the sample 1.

As a further advantage, the technique of WO 2016/102056 A1 measures the electric field, inherently accessing the full phase information in contrast to standard frequency-domain spectroscopy or time-domain measurements of the FID intensity as performed, e.g., by Lanin et al. in "Nature Scientific Reports" 4, 6670 (2014). As another advantage over time-domain measurements of the FID intensity, in FRS the FID signal rolls off linearly with the decay of the field amplitude rather than its squared value.

Notably, if the instrument according to FIG. 12 is characterized by a linear response, then the measured sample wave 3 corresponds to the full electromagnetic response of the sample to the excitation field (measured by the same instrument with the sample removed). This way one gains access to the full information of the macroscopic polarization of the sample 1, with few-femtosecond (to potentially sub-femtosecond) temporal resolution. Importantly, increasing the power of the driving pulse proportionally enhances the useful FID (henceforth: GMF) signal above detection noise floor, without any increase of disturbing background. Thus, the scheme of WO 2016/102056 A1 is truly power scalable with respect to the source: the molecular signal temporally separated from the (much more intense) excitation can be increased by boosting the source power without a dynamic range "exhausted" by the excitation power, in contrast to the above limitations of frequency-domain spectroscopy. Moreover, electro-optic sampling (MS) of the excitation pulse 2 and the sample wave 3 obviates the need for poor-sensitivity infrared photon detectors. Nevertheless, the implementation of FRS with these sampling techniques also implies that the strong excitation pulse preceding the sample wave compromises the sensitivity of these sampling techniques for measuring smallest GMF signals (i.e. weakest sample waves).

Very recent benchmarking experiments were carried out with the prototype embodiment of the FRS technology disclosed in WO 2016/102056 A1. In a benchmarking experiment, a dilution series of trehalose in water was investigated with both FRS and FTS. For the latter a state-of-the-art Fourier-transform spectrometer (MIRA-Analyzer, Micro Biolytics) was used. The experiments revealed concentration detection limits of lower than 0.001 mg/mL and approximately 0.01 mg/mL for measurement times of 50 s for FRS and 45 s FTS, respectively. These results confirm the far superior performance of FRS regarding the detection limit of weak GMF signals.

Physical Principles of Stimulated Raman Scattering

Another implementation of vibrational spectroscopy is based on stimulated Raman scattering (SRS), wherein the stimulated Raman process has been used to study the temporal and spectral vibrational structure of numerous molecular systems. In SRS, two excitation fields at a pump frequency, $\omega_p$, and a Stokes frequency, $\omega_s$, are sent simultaneously into the sample under study. Molecular transitions are enhanced, if the difference frequency of the excitation beams, $\Delta\omega = \omega_p - \omega_s$, matches a vibrational frequency, $\Omega$, of a molecule of the sample, resulting in loss and gain of the transmitted pump and Stokes intensity, respectively. The induced changes in these intensities are generally small compared to the linear scattering or linear absorption of the sample. This shortcoming has been addressed by scaling the energy of the excitation fields (McCamant et al. in "Rev. Sci. Instrum.", 75(11), 4971 (2004), or high-frequency modulation of the excitation fields (Freudiger et al. in "Science", 322(5909), 1857 (2008). However, the first approach is of limited utility for biological applications and the second one suffers from complexity and long acquisition time.

Using a broadband (near-octave-spanning) Stokes or pump pulse provides access to the entire spectrum of vibrational frequencies. For combining this advantage with high spectral resolution, one of the two pulses must be narrowband (with its spectral bandwidth dictating the spectral resolution of the measurement) and the other one is broadband. The GMF signal here then appears again as a wake of the broadband and ultrashort pump or Stokes excitation pulse, analogously to the implementation with a resonant infrared excitation pulse described in WO 2016/102056 A1, and—in its own spectral band—in a background-free fashion. However, SRS measurements have not been addressed in WO 2016/102056 A1.

Limitations of FRS (i) While FRS as disclosed in WO 2016/102056 A1 has been demonstrated to be superior to frequency-domain vibrational spectroscopies in terms of sensitivity for the molecular GMF signal of interest, it still offers room for substantial improvement in several respects. First, the detection sensitivity of the electro-optic sampler measuring $E_{GMF}$ (t) is orders of magnitude smaller than it could be in the absence of the excitation pulse. This is because the sample wave 3 beam carrying both the main pulse 2' and the GMF wave can only be gently focused into the sampler to avoid its damage by the strong main pulse preceding the GMF wave. Removing the excitation pulse would allow a much stronger focusing of the GMF/sample wave into the EOS detector, resulting thereby a correspondingly increased sensitivity in the detection of the weak GMF/sample wave of interest.

(ii) Moreover, in molecular pathology and cell biology, where, as explained above, the major challenge consists in the identification of smallest changes in concentration of both low- and high-abundance molecules in complex mixtures. Actually, in the FRS scheme discussed so far even high relative changes in the concentration of low-abundance constituents may be completely masked by contributions from high-abundance specimens, leaving these potential biomarkers unnoticed (just as they are left unobserved by the limited dynamic range in all other techniques capable of detecting multiple constituents).

(iii) Last but not least, in the case of complex molecular mixtures, such as biological samples, the GMF signal consists of the superposition of the electric fields emitted by molecules of numerous different types, occurring with both low and high abundances. As the amplitude of the GMF signal increases with the number of emitters (which is very large in a complex sample), so does the relative intensity noise of $E_{GMF}$(t), transferred to the GMF signal from the excitation. Consequently, amplitude variations due to radiation source noise mask the temporal fingerprint induced by small changes in the molecular composition of the sample. Moreover, these changes also need to overcome a possible background resulting from imperfections of the measurement system.

OBJECTIVE OF THE INVENTION

The objective of the invention is to provide an improved method of measuring a temporal polarization (or: spectral) response of a sample, in particular a biological sample, and an improved spectroscopic apparatus for measuring a temporal polarization (or: spectral) response of a sample, in particular a biological sample, being capable of circumventing limitations of conventional techniques, in particular the above-mentioned limitations of FRS. The polarization response is to be measured with improved sensitivity and/or reproducibility.

SUMMARY OF THE INVENTION

These objectives are correspondingly solved by a method and a spectroscopic apparatus comprising the features of the independent claims, respectively. Preferred embodiments and applications of the invention arise from the dependent claims.

According to a first general aspect of the invention, the above objective is solved by a method of measuring a polarization response of a sample, in particular a biological sample, comprising the following steps.

A sequence of excitation waves is generated. The excitation waves (called probe light in conventional FRS) are generated as a train of laser pulses with a laser source device, wherein each excitation wave has a primary temporal shape and spectral content, preferably with a center wavelength in the infrared spectral range. Preferably, the full-width-at-half-intensity-maximum pulse duration of the excitation waves is equal to or below 1 ps, in particular equal to or below 300 fs. If the sample to be investigated is in the gas phase, having sharp vibrational bands and an FID in a range of tens of ps, a narrowband excitation wave with a pulse duration equal to or below 1 ps and above 500 fs can be provided. Otherwise, with sample in the liquid phase having broad vibrational bands and an FID in a range of 1 ps or shorter, a broadband excitation wave with a pulse duration equal to or below 300 fs can be provided.

The sample to be investigated is irradiated with the excitation waves, including an interaction of the excitation waves with the sample, so that a sequence of sample waves (called modified probe light in conventional FRS) is generated each including a superposition of an instantaneous polarization response of the sample, referred to as sample main pulse and a (usually much weaker) trailing part arising from the sample's non-instantaneous polarization response to the excitation wave, referred to as the free-induction decay, briefly FID signal or, in particular in the case of biological samples, a sample global molecular fingerprint (GMF) wave ($E_{GMF(sample)}$(t)), briefly GMF wave or GMF signal. The modified temporal shape and spectrum of the sample wave deviate from the primary temporal shape and spectrum of the excitation wave (respectively) by features, which are determined by the polarization response of the sample. The sample under investigation is a solid, liquid or gas phase sample, in particular of biological origin.

Furthermore, a reference sample (or: control sample) is provided, which is another sample (in solid, liquid or gas phase), in particular of biological and/or of synthetic nature, to which the sample to be investigated is to be compared in terms of its GMF. The reference sample may comprise e.g. a sample which does not include certain molecules of interest or another which includes the molecules of interest with another concentration (e.g. an elder sample from the same source like the sample under investigation). A synthetic reference sample is a reference sample with a well-known and highly reproducible molecular composition, in particular comprising those molecules which are not of interest in the investigation of the sample. The reference sample is irradiated with the sequence of excitation waves, including an interaction of the excitation waves with the reference sample, so that a sequence of reference waves is generated each including a superposition of a reference main pulse and a reference GMF wave ($E_{GMF(ref)}(t)$).

According to the invention, a difference of the sample waves and the reference waves is optically separated in space and/or time from GMF wave contributions which are common to both of the sample waves and the reference waves. Accordingly, at least one optical adjustment device is provided which spatially and/or temporally separates the difference of the sample waves and the reference waves, which is to be detected for investigating the sample, from the common GMF wave contributions, which are not specific for the sample under investigation.

The difference of the sample waves and the reference waves is detected and a temporal amplitude function of differential molecular fingerprint (dMF) waves ($\Delta E_{GMF}$) is determined each comprising the difference of the sample and reference GMF waves. Detecting preferably comprises electro-optic sampling (MS) or, alternatively, photo-conductive sampling (PCS). The dMF wave is determined by direct detection (sampling) or by calculating based on detected sample and reference waves. It represents the polarization response of the sample (called "spectral response" in WO 2016/102056). The particular type of polarization response depends on the design of the excitation waves, which can be adapted e.g. for an IR absorption or an SRS measurement.

According to the invention, for the optically separating step, the sample waves and the reference waves are spatially and/or temporally separated from each other before the detecting step. Separating the sample and reference waves comprises a targeted adjustment of the sample and reference waves relative to each other, in particular a reduction of the spatial and/or temporal overlap of the sample and reference waves. The overlap of the sample and reference waves preferably is minimized or even excluded in space and/or time domain. In other words, separating the sample and reference waves comprises a partial or even complete reduction of their overlap in space and/or time domain.

According to the separation of the sample and reference waves, a spatial and/or temporal separation of the dMF wave, i.e. the difference of the electric fields corresponding to the sample and reference GMF, from any other participating waves is maximized in space and/or in time. This is achieved by accordingly adjusting the participating waves (excitation wave, reference wave and sample wave) relative to each other in space and/or in time. In this manner, the invention advantageously makes use of the background-free detection of FRS to measure the difference signal $\Delta E_{GMF}(t)$, which directly reflects differences in the molecular composition of the reference sample and the sample under investigation, with improved sensitivity.

Although not always emphasized in the following, it is noted that the excitation waves comprise a sequence of laser pulses created with a repetition rate preferably above 1 kHz, particularly preferred above 1 MHz. Accordingly, the sample and reference waves are sequences of laser pulses as well. The terms excitation wave, reference wave and sample wave refer to sequences of the corresponding waveforms used for irradiating the reference sample and the sample under investigation or provided by the spectral response of the reference sample and the sample under investigation, resp.

According to a second general aspect of the invention, in terms of device features, the above objective is solved by a spectroscopic apparatus for measuring a polarization response of a sample, in particular a biological sample, which comprises a laser source device, an optical adjustment device, a detector device and optionally a calculation device. Preferably, the spectroscopic apparatus is adapted for conducting the above method of measuring a polarization response of a sample according to the first general aspect of the invention. The laser source device is adapted for generating a sequence of excitation waves and for irradiating the sample with the sequence of excitation waves, including an interaction of the excitation waves with the sample, so that a sequence of sample waves is generated each including a superposition of a sample main pulse and a sample global molecular fingerprint (GMF) wave ($E_{GMF(sample)}(t)$), and for irradiating a reference sample with the sequence of excitation waves, including an interaction of the excitation waves with the reference sample, so that a sequence of reference waves is generated each including a superposition of a reference main pulse and a reference GMF wave ($E_{GMF(ref)}(t)$). The optical adjustment device is arranged for optically separating a difference of the sample waves and reference waves from wave contributions which are common to both of the sample waves and reference waves in space and/or time. The detector device is arranged for detecting the difference of the sample waves and the reference waves and determining a temporal amplitude function of differential molecular fingerprint (dMF) waves ($\Delta E_{GMF}$) each comprising the difference of the sample and reference GMF waves.

According to the invention, the optical adjustment device for spatially and/or temporally separating the difference of the sample waves and reference waves from wave contributions which are common to both of the sample waves and reference waves is an adjustment device included in the spectroscopic apparatus. The terms "separating", "adjusting" or "adjustment" refer to any targeted manipulation, in particular targeted wave-form shaping, of the excitation wave (and optionally the reference wave) such that the difference GMF, $\Delta E_{GMF}(t)$, carrying useful information on the difference in molecular composition between the reference sample and the sample under investigation is located in time as far as possible behind the main pulse of the sample wave. The optical adjustment device comprises passive and/or active optical components, like transmissive and/or reflective components and/or amplifying components, shaping the wave-form of the excitation wave and/or the sample waves. The inventors have found that the background created by the excitation wave can be substantially suppressed or the sensitivity of detecting the difference GMF can be substantially increased by the inventive separating step or adjustment device, resp., thus improving the sensitivity of the FRS detection.

The dMF waves can be output as the characteristic polarization response to be obtained. Optional, the calculation device can be provided for calculating the dMF wave based on detected sample and reference waves and/or for analysing the sensed dMF waves, e.g. for providing a polarization response of the sample on the basis of a Fourier transformation of the temporal amplitude function of the dMF waves, and/or for analysing a change of the sample composition based on the dMF waves determined with the sample under investigation and/or a reference sample.

According to a preferred application of the invention, the sample under investigation comprises a biological sample from a human or animal organism. The spectral response of the sample and/or the difference of its GMF with respect to the control (reference) sample, is measured for obtaining diagnostically relevant information on the organism. The term "diagnostically relevant information" refers to any information on the sample, in particular the composition thereof, differences compared with reference samples or temporal changes of the sample, which can be used for providing or validating a medical diagnosis. In particular, the invention aims at detecting changes in molecular composition, which may mark a deviation from normal physiology or identify a different cell type, in a single measurement, by direct comparison of the sample (or cell) under scrutiny with a reference (or reference cell from the same organism), also referred to as "control", with unprecedented sensitivity.

Accordingly, with a preferred embodiment of the invention, the measuring method may include a step of evaluating the spectral response of the sample in order to obtain the diagnostically relevant information. In terms of device features, a preferred embodiment of the spectroscopic apparatus preferably includes the calculation device, which is adapted for processing the spectral response and providing the diagnostically relevant information. Advantageously, the diagnostically relevant information can be output to a user of the inventive technique, e.g. a medical doctor. Subsequently, the user can provide a diagnosis in consideration of the diagnostically relevant information. A spectral response evaluation can be implemented as disclosed in WO 2016/102056 A1.

According to embodiments of the invention, differences in the fingerprints, i.e. different dMF waves of samples differing only by small numbers of—both high- and low-abundance—molecules are sensed. This can be expressed in terms of a simple formula: if $E_{GMF(sample)}(t)$ is the sample GMF signal and $E_{GMF(ref)}(t)$ is the reference GMF signal, then the following dMF signal is detected with the highest possible sensitivity:

$$\Delta E_{GMF}(t) = E_{GMF(sample)}(t) - E_{GMF(ref)}(t).$$

According to a first variant of the invention (first embodiment of the invention, embodiment (I)), the spatial separation of difference of the sample waves and reference waves from wave contributions which are common to both of the sample waves and reference waves is achieved by exposing the sample and the reference sample simultaneously with identical replicas of the excitation pulse (resonant IR absorption) or pulses (SRS) and interferometrically combining the broadband excitation pulse and GMF wave transmitted through the sample and the reference, with a 180-degree phase shift between them, such that the two excitation pulses largely cancel out each other and the respective GMF waves interferometrically combine to yield the above difference. The interferometric cancellation of the reference wave and the sample wave, preferably down to zero equals a detection of the dMF wave. Therefore, the first embodiment of the invention is also called differential molecular fingerprinting (dMF) or dMF embodiment.

Elimination of the excitation field from the signal resulting from this interferometric combination allows the weak differential GMF wave, $\Delta E_{GMF}(t)$, to be optimally focused into the detection device, preferably including EOS or PCS detector, of the spectroscopic apparatus and thereby removing the above-discussed limitation (i) of FRS as disclosed in WO 2016/102056 A1. The differential GMF wave $\Delta E_{GMF}(t)$ yields the differential global molecular fingerprint of the sample under investigation with respect to the reference sample, composed of the differences between the waves emitted by the different types "i" of molecules, the strength of which scales with their number $\Delta N_i$, which denotes the difference between the number of molecules of type "i" in the sample under investigation and the reference sample:

$$\Delta E_{GMF}(t) = \Delta E_1(t) + \Delta E_2(t) + \ldots + \Delta E_i(t) + \ldots$$

The inventors have found that for typical molecular concentrations in biological samples, $\Delta E_i(t) \propto \Delta N_i$ holds in very good approximation. Hence $\Delta E_{GMF}(t)$ contains information about molecules based only on their concentration changes with respect to the reference, irrespective of their abundance, removing the above-discussed limitation (ii) of FRS as disclosed in WO 2016/102056 A1. Last but not least, due to direct referencing, the noise carried by $E_{GMF(sample)}(t)$ and $E_{GMF(ref)}(t)$ being both dictated by the noise of the common excitation source, largely cancel out, efficiently addressing the above-discussed limitation (iii) of FRS as disclosed in WO 2016/102056 A1.

According to a second variant of the invention (second embodiment of the invention, embodiment (III), including temporal separation of the difference of the sample waves and reference waves from wave contributions which are common to both of the sample waves and reference waves, a group delay dispersion in beam paths including the sample and the reference sample is set such that the reference wave is temporally compressed, preferably shortened towards the Fourier transform limit thereof. Due to compressing the reference wave, the dMF signal is mainly determined by the sample GMF wave, so that above limitations (i) to (iii) of the FRS as disclosed in WO 2016/102056 A1 can be removed.

According to a third variant of the invention (third embodiment of the invention, embodiment (III)), including temporal separation of the difference of the sample waves and reference waves from wave contributions which are common to both of the sample waves and reference waves, an interaction length (I) of the excitation waves within the sample and the reference sample is set in a range from I=2/25α, to I=10/α, wherein α is the absorption coefficient of the reference sample. Advantageously, setting the interaction length allows maximizing the sample GMF wave and the dMF wave.

According to a fourth variant of the invention (fourth embodiment of the invention embodiment (IV)), the dMF signal or the sample GMF signal is subjected to an optical parametric amplification before detection, resulting in a further increase of the sensitivity of FRS.

The above first to fourth embodiments of the invention can be implemented alone or in any combination. Thus, according to a particularly preferred embodiment of the invention, the dMF signal $\Delta E_{GMF}(t)$ resulting from direct interferometric referencing (I) can be further enhanced by careful dispersion setting (II), combined with an optimization of the interaction geometry (Ill) and by its optical parametric amplification before and/or after detection (IV). Alternatively, the dMF wave can be detected without interferometric referencing (I), but with dispersion setting (II), optimization of the interaction geometry (III) and/or optical parametric amplification (IV). The implementation of these concepts via resonant infrared excitation as described in WO 2016/102056 A1 can be complemented with stimulated Raman scattering being the excitation mechanism (SRS embodiment, embodiment (V)), in order to access both infrared and Raman-active vibrational modes for the acquisition of a complete vibrational fingerprint.

Differential molecular fingerprinting (dMF) drawing on field-resolved vibrational spectroscopy (FRS), preferably complemented with the above listed innovations holds promise for measuring directly changes in concentration of molecular constituents irrespective of their abundance, for disease marking with exquisite specificity (thanks to the measurement of correlated changes of an unprecedented number of constituents) and highest sensitivity (thanks to the advances described above). Preferred features of the above first to third embodiments are summarized in the following.

According to a preferred variant of the first embodiment, the interferometric cancellation of the reference wave is obtained using a Mach-Zehnder interferometer. The excitation wave is input at a first port of the Mach-Zehnder interferometer, the sample to be investigated is arranged in a first interferometer arm of the Mach-Zehnder interferometer, the reference sample is arranged in a second interferometer arm of the Mach-Zehnder interferometer, and the dMF wave is provided at a first output port (difference output port) of the Mach-Zehnder interferometer. The Mach-Zehnder interferometer preferably is configured such that the modified probe light is collected in transmission at the sample to be investigated and the reference sample. Using the Mach-Zehnder interferometer has advantages in terms of precise and stable adjustment of the interferometer arms, facilitating the suppression of the fingerprint common to the reference and the sample waves.

Preferably, the beam propagation path lengths in the first and second interferometer arms of the Mach-Zehnder interferometer are set equal within one half carrier wavelength of the excitation waves, i.e. one half central wavelength of the excitation waves. Particularly preferred, the beam propagation path lengths are set equal by a control loop minimizing a temporally-averaged power at one of the output ports of the Mach-Zehnder interferometer.

According to the second embodiment of the invention, the separating the sample and reference waves includes creating of a temporal separation of the dMF wave from the reference wave. Preferably, the step of setting the group delay dispersion includes shortening the reference main pulses and shortening the GMF wave contributions commonly included in both of the sample and reference GMF waves. The GMF wave contributions commonly included in both of the sample and reference GMF waves in particular comprise polarization responses of the molecules equally included in the sample and the reference sample, like e.g. a sample matrix, like a solvent, and/or molecules, which are not of interest for the particular investigation, and/or material of the sample and reference container walls. Preferably, sample containers for liquid or gas samples, in combination with chromatic dispersion compensation are presented as outlined in the following. The second embodiment applies for both linear and nonlinear spectroscopy schemes.

Preferably, the excitation waves are generated with a Fourier transform limit pulse duration, and the excitation waves and/or the sample and reference main pulses are subjected to a dispersion compensation reducing a pulse stretching effect of any substance along the beam paths. This can be obtained by providing the sample container of the sample and the reference container of the reference sample with container wall material having negative or positive dispersion, and/or by applying negative or positive dispersion by reflective elements before and/or after the sample and the reference sample. Alternatively, the excitation waves are generated with a pulse chirp such that the dispersion introduced along the beam paths compensates the pulse chirp. With this embodiment, the sample container and the reference container are provided with container wall material having a dispersion, which cancels out the pulse chirp, and/or dispersion is applied by reflective elements before and/or after the sample and the reference sample such that the pulse chirp is cancelled out.

According to a further preferred embodiment of the invention, maximizing probe light transmission through the sample is provided by an antireflection coating on the sample container of the sample and on the reference container of the reference sample, and/or by placing the sample or the sample container and the reference container under the Brewster angle relative to the excitation wave beam path. An adjustment component is provided by the antireflection coating and/or a sample container support setting the Brewster angle. In this case, inventive adjusting or shaping waveforms includes increasing the amplitude in particular of the sample wave.

Advantageously, the increased sensitivity of detecting the sample wave or the dMF wave provides a new application of the FRS technique in the field of SRS measurements. Thus, according to a further preferred embodiment of the invention (SRS embodiment), the inventive measuring of the spectral response of the sample comprises electric field-detection of stimulated Raman scattering at the sample. The sample is simultaneously irradiated with a sequence of simultaneous pump pulses and Stokes pulses. One of the pump pulses and Stokes pulses is a narrowband pulse, and the other one is a broadband pulse. The narrowband pulse is adapted for exciting a single vibrational transition of the sample, while the broad band pulse is adapted for exciting a plurality of vibrational transitions of the sample. The excitation wave is provided by the broadband Stokes pulses (or alternatively the broadband pump pulses). The sample and reference waves are provided by the Stokes pulses enhanced by a vibrational Raman response of the sample and the reference sample, resp., or alternatively the pump pulses diminished by a vibrational Raman response of the sample and the reference sample. In terms of the spectroscopic apparatus, which is adapted for electric field-detection of stimulated Raman scattering at the sample, the laser source device is configured for simultaneously irradiating the sample with the sequence of pump pulses and Stokes pulses and the detection device is adapted for detecting the Stokes pulses enhanced by a vibrational Raman response of the sample (or alternatively the pump pulses diminished by a vibrational Raman response of the sample).

In summary, the inventive FRS driven by coherent e.g. few-cycle-pulse sources offers the following distinct advantages. FRS with well-compressed pulses improves the detection sensitivity with respect to frequency-domain spectroscopies by eliminating the noise of the excitation signal detection as a limit to the smallest molecular signal detectable. dMF detection based on FRS is capable of improving the detection sensitivity of FRS in several ways:

By eliminating the technical noise of the molecular signal as a limit to its smallest change detectable. This is because any fluctuation in the molecular signal caused by the noise of the excitation, which is supposed to dominate, appears equally in the sample and reference arms and hence cancels out at the differential output with the exception of quantum noise.

Equally importantly, dMF also efficiently eliminates any post-excitation background that may result from imperfections (such as a non-exponential roll-off of the excitation pulse and satellites caused by spurious reflections), which may severely affect FRS sensitivity.

dMF allows direct optical amplification of the differential signal after suppression of the excitation pulse. The selectively amplified differential GMF wave can induce a much stronger EOS detection signal with the excitation wave suppressed than it could with the excitation wave present (as it would be in FRS) because the latter tends to cause optical breakdown in the EOS crystal at very low field strengths of the useful molecular signal. Sufficiently strong optical amplification of the differential molecular signal may improve the sensitivity of EOS detection of differential molecular signals, in addition to the sensitivity improvement directly gained by amplification. This improvement comes in combination with a relaxed requirement for dynamic range of the detection electronics (due to the elimination of the main pulse from the measured difference GMF).

Global molecular fingerprinting implemented with the invention pursues very much the same goals as the untargeted biomarking search/screens, e.g. via proteomics and metabolomics. Yet, the approach is fundamentally different: The "omics" methodology aims at the identification of sets of molecular components the concentration change (or new appearance) of which can be unambiguously indicative of a certain pathology. In sharp contrast, changes in the GMFs obtained by FRS are due to the integral effect of miniscule concentration changes of presumably a vast number of existing and possibly a number of newly appeared molecules. Many (presumably most) of these molecular constituents are individually inaccessible by omics techniques but may contribute measurably to the spectroscopic GMF owing to the superior dynamic range of field-resolved spectroscopy. Changes in the concentration of low-abundance molecules can also be of high importance, a prominent example being e.g. cytokines even miniscule concentration change of which is known to lead to extensive physiological effects.

The concept of global molecular fingerprinting by field-resolved spectroscopy holds promise for directly accessing deviations in the GMF of any complex biofluid samples (e.g. human blood) from that of a suitably-chosen reference and thereby for the search of clinical classifiers in observables delivered directly by measurement. Direct comparison of global molecular fingerprints of two different samples in one and the same measurement relies on coherence between the underlying physical observables, a condition that can only be fulfilled efficiently by laser spectroscopy at present. This unique capability along with the unprecedented dynamic range of FRS and in combination with omics technologies (such as high-pressure liquid chromatography, HPLC) holds out the promise of advancing molecular fingerprinting to unprecedented sensitivity and throughput and thereby opening new avenues for early detection and screening.

BRIEF DESCRIPTION OF THE DRAWINGS

Further details and advantages of the invention are described in the following with reference to the attached drawings, which show in.

PREFERRED EMBODIMENTS OF THE INVENTION

Figure 1:
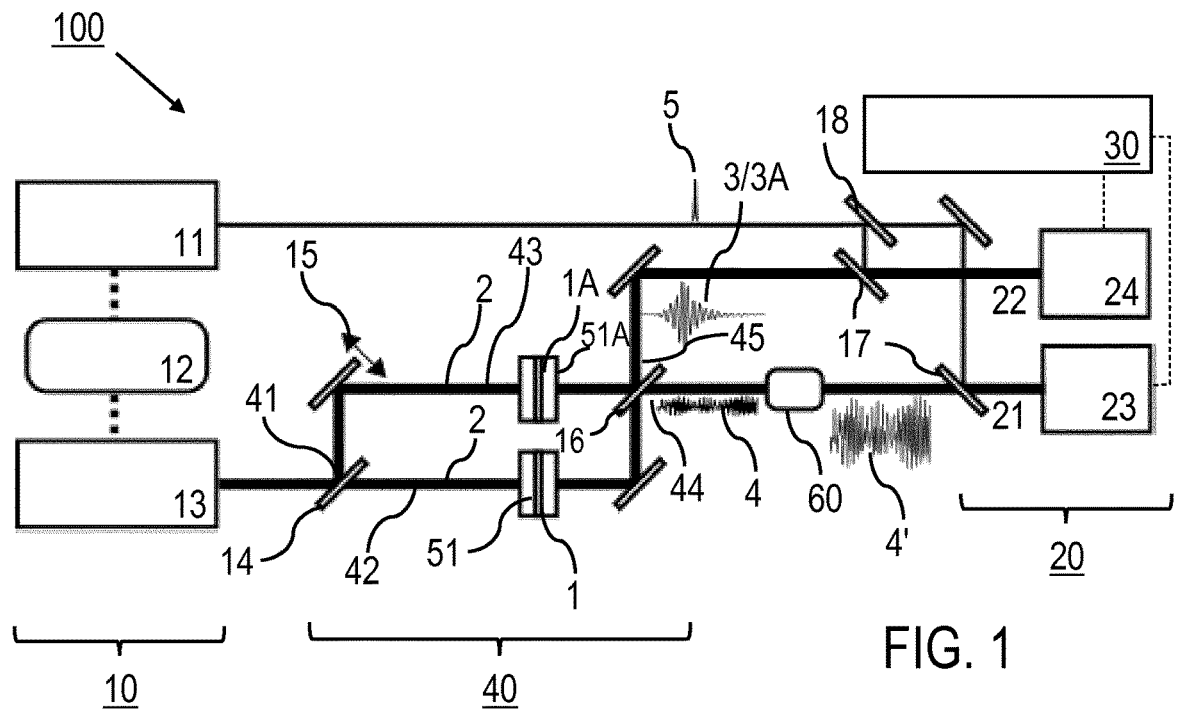
FIG. 1: a schematic illustration of a spectroscopic apparatus according to the first embodiment (dMF embodiment) of the invention.
Figure 2:
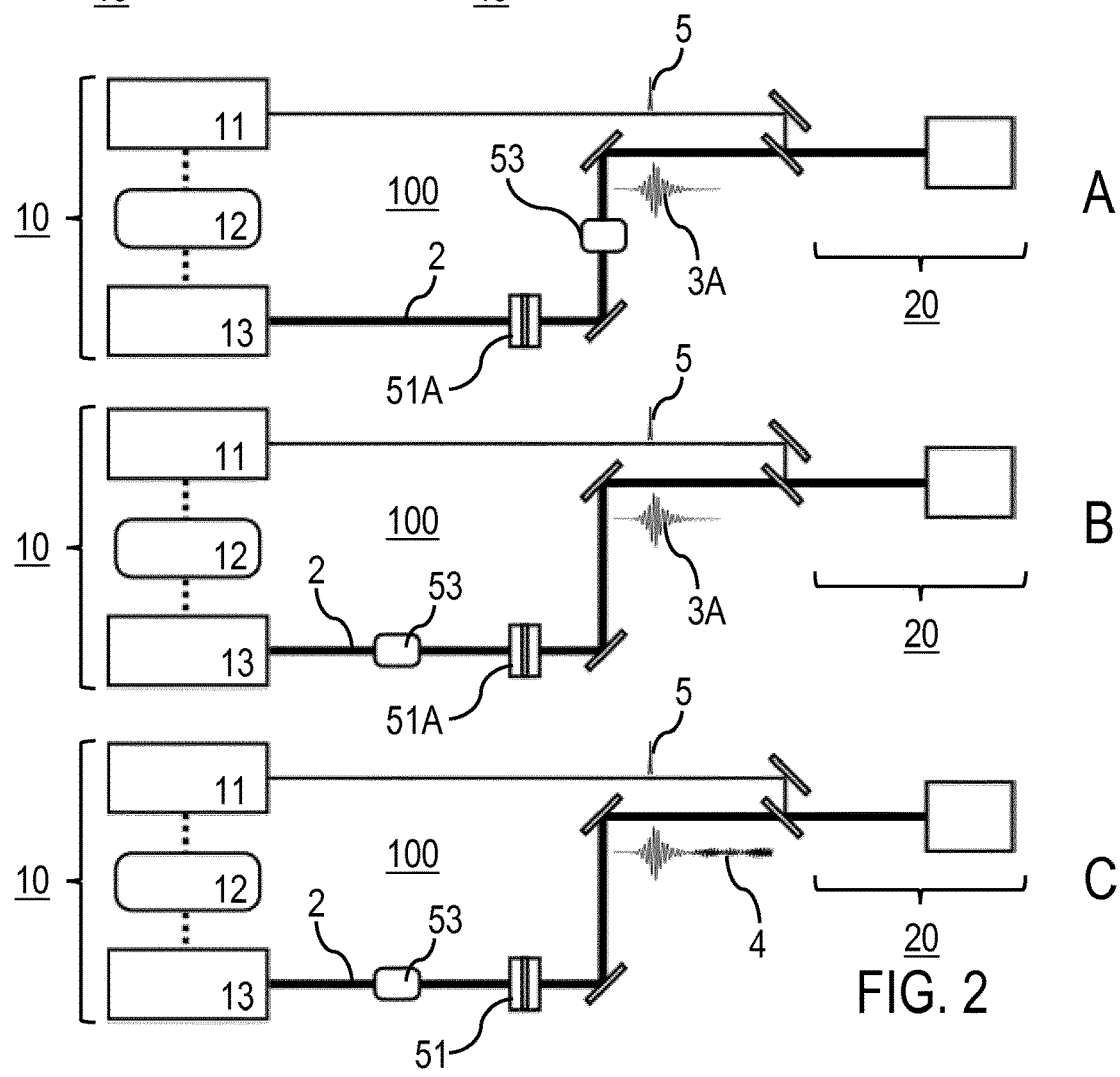
FIGS. 2 and 3: schematic illustrations of a temporal separation of the difference GMF from the fingerprint common to both the reference and the sample waves according to the second embodiment of the invention.
Figure 3:
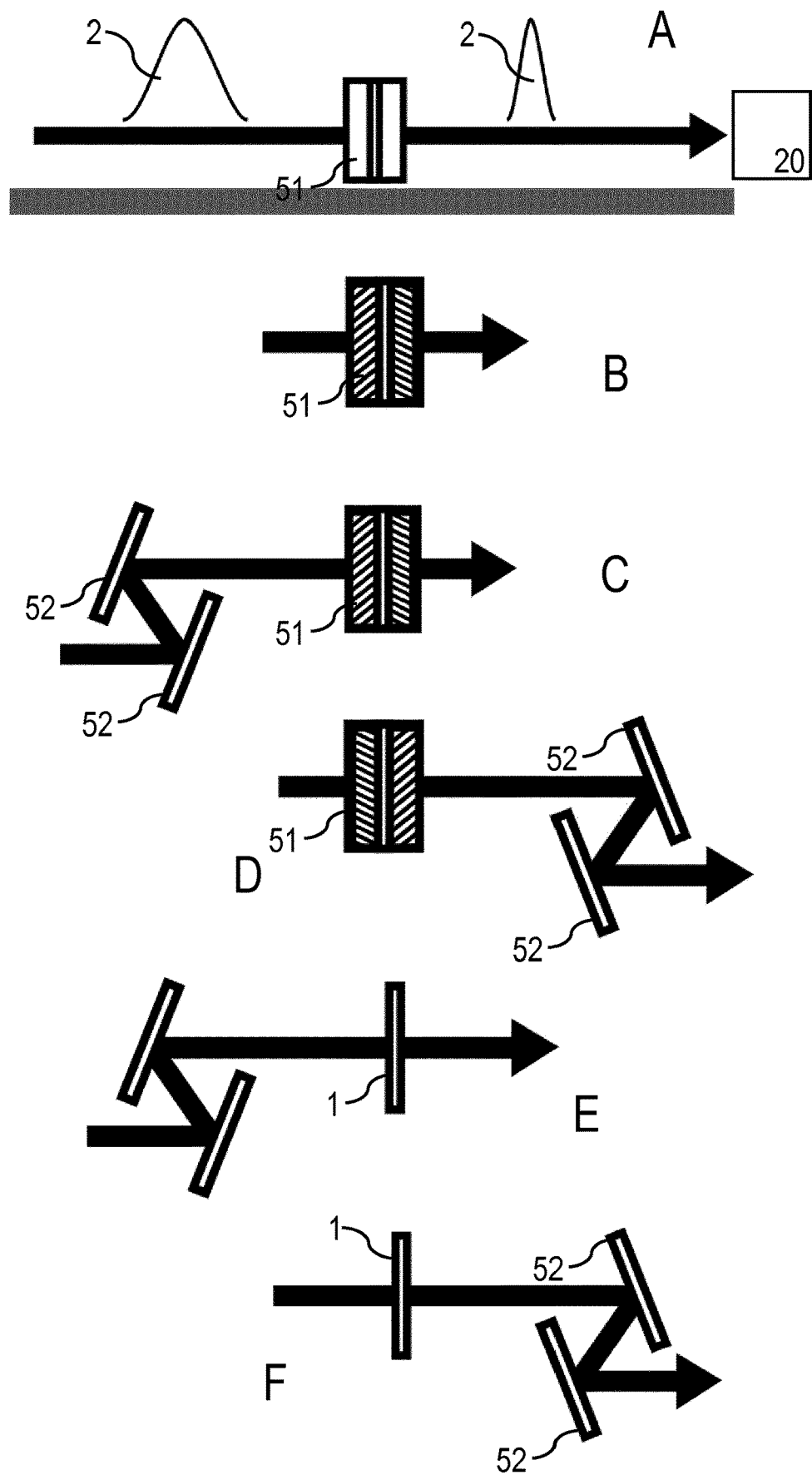

Features of preferred embodiments of the invention are described in the following with reference to differential molecular fingerprinting including interferometric referencing (I), e.g. for an IR absorption or an SRS measurement (V), dispersion compensation of the reference wave (II), optimization of the interaction geometry (III) and/or optical amplification of the differential fingerprint (IV). The features (I) to (IV) implement inventive measures for adjusting the participating waves relative to each other such that contributions of the differential GMF are separated in space and/or in time from the fingerprint common to both the reference and the sample waves. For example, (I) provides a spatial separation of the differential GMF from the excitation wave and the reference wave by interferometric means, while (II) introduces a temporal separation of the differential GMF. The features (I) to (IV) can be provided alone or in any combination. As an example, the features (II) and/or (III) can be provided in the setup of differential molecular fingerprinting (I) as shown in FIG. 1, in the special case of (I) including a stimulated Raman measurement of FIG. 9 or even with the conventional setup of FIG. 12. As another example, the features of (IV) can be omitted if an optical amplification is not necessary, e. g. in the setup of (I) differential molecular fingerprinting (FIG. 1). Furthermore, the features of (I) to (IV) can be provided with liquid or solid materials or with gaseous samples.

Differential molecular fingerprinting (dMF) measures directly the change in concentration of molecular constituents, i.e. the quantity of direct relevance for disease marking, with highest possible sensitivity. This supports the following advantages (a) the noise of $E_{GMF}(t)$, which limits its smallest changes inferable from separate measurements, cancels out (with the exception of quantum noise) upon direct coherent referencing (see (I) below);

(b) $E_{GMF}(t)$ can be efficiently separated from most of the main pulse part of all participating waves and maximized by (i) broadband coherent control of $E_{in}(t)$ (see (II) below) and (ii) optimization of the interaction geometry (see below); and, (c) the differential fingerprint, $\Delta E_{GMF}(t)$, can be amplified parametrically by several orders of magnitude before being detected by electro-optic sampling (see (IV) below).

Preferred embodiments of the invention are described in the following with exemplary reference to particular examples of fs laser source devices and the application of electro-optic sampling (EOS). It is emphasized that the invention is not restricted to the described embodiments. In particular, the laser source device can be modified for providing the probe light pulses as specified in the present description. As an example, a ps laser source device can be used, in particular for gaseous samples. Furthermore, the EOS method can be replaced by another spectroscopic technique, like e.g. electric field sampling with photoconductive antennas or FTIR spectroscopy. Exemplary reference is made to the preferred application of the invention for providing diagnostically relevant information. It is emphasized that the invention is not restricted to the investigation of biological samples, but rather can be implemented with other samples, like e.g. environmental samples.

(I) Differential Molecular Fingerprinting (dMF) with Coherent Interferometric Referencing FIG. 1 shows features of a spectroscopic apparatus 100 according to a preferred embodiment of the invention, which is adapted for interferometric separation of the dMF wave from the wave contributions which are common to both of the sample waves and reference waves, in particular from the excitation wave and the reference wave. The spectroscopic apparatus 100 is structured similar to the conventional setup of FIG. 12. Accordingly, features of the conventional spectroscopic apparatus, in particular with regard to the laser source device and the detector device and especially the electro-optical detection principle can be implemented as disclosed in WO 2016/102056 A1, which is introduced to the present specification by reference.

The spectroscopic apparatus 100 of FIG. 1 comprises a laser source device 10, including a visible or Near-Infrared (NIR) femtosecond source 11 for creating a sequence of initial driving pulses, an MIR-Infrared (MIR) femtosecond source 13 (including e.g. a $LiGaS_2$ crystal) for creating a sequence of MIR pulses based on the driving pulses and a synchronization and delay unit 12 for a mutual adjustment of the MIR and driving pulses (e.g. with a delay stage if the MIR pulses are generated from the visible or NIR source 11 or with a synchronization and adjustment of the repetition rates of the NIR and MIR source). The excitation waves 2 being provided by the driving pulses for the interaction with the sample under investigation 1 and the reference sample 1A are output from MIR femtosecond source 13.

The excitation waves 2 pulses are split with a 50:50 MIR beam splitter 14, which provides a first input port 41 of a Mach-Zehnder interferometer 40, into a first interferometer arm 42 and a second interferometer arm 43 of the Mach-Zehnder interferometer 40. The function of the Mach-Zehnder interferometer 40 providing an optical adjustment device is described below. In the first interferometer arm 42, the sample 1 with the sample container 51 is provided, including e.g. biological sample molecules included in water. The reference sample 1A is included in an identical reference container 51A in the second interferometer arm 43. Preferably, the sample and reference containers 51, 51A are adapted for low transmission losses in the whole (mid-) infrared region (from 2 μm to 30 μm). To this end, antireflection coatings can be provided on the surfaces of the sample containers 51, 51A for increasing the MIR transmission thereof. Furthermore, the sample containers 51, 51A can be arranged with the Brewster angle relative to the beam paths along the interferometers arms 42, 43.

Furthermore, a schematically shown delay unit 15 for a mutual adjustment of the lengths of both interferometer arms 42, 43 is arranged in the second interferometer arm 43. The delay unit 15 can be controlled with a control loop (not shown) such that the geometrical length difference of the two interferometer arms of the Mach-Zehnder interferometer 40 is minimized. Interferometer adjustment can be performed with one or more piezoelectric transducers (PZT).

By the interaction of the excitation wave 2 with the sample 1 under investigation and with the reference sample 1A, the sample wave 3 is created in the first interferometer arm 42 and the reference wave 3A is created in the second interferometer arm 43. By the coherent superposition of the sample and reference waves 3, 3A at the 50:50 MIR beam splitter/combiner 16, the dMF wave 4 is generated at the difference output port 44 (first output port), and the constructive coherent superposition of the fingerprint common to both the reference and the sample wave is generated at the sum output port 45 (second output port). With the beam splitter/combiner 16, the dMF wave 4 is submitted to a first detector channel 21 of the detector device 20 and the superposition of the sample wave 3 and the reference wave 3A is submitted to a second detector channel 22 of the detector device 20. An optical parametric amplification device 60 for optical amplification of the dMF wave 4 (e.g. with optical parametric amplification (OPA)) and creating an amplified dMF wave 4' is arranged in the first detector channel 21. Further details of the optical parametric amplification device 60 and the function thereof are described below with reference to FIGS. 6 and 7.

The detector device 20 includes electro-optic sampling units 23, 24 each in one of the detector channels 21, 22. Parts of driving pulses created with the femtosecond source 11 are submitted as sampling pulses 5 via MIR-NIR beam combiners 17 and an NIR beam splitter 18 to the electro-optic sampling units 23, 24, resp. The first and second electro-optic sampling units 23, 24 detect a temporal amplitude function of the amplified dMF wave 4A and the sum signal 3/3A, resp.

The calculation device 30 comprises a computer circuit calculating the spectral response of the sample under investigation 1 on the basis of a Fourier transformation of the temporal amplitude function of the amplified dMF wave 4A detected in the first detection channel 21. It is noted that the second detector channel 22 is an optional feature of the invention, e.g. for monitoring or control purposes.

In practice, the spectroscopic apparatus 100 is adapted for measuring any gas or liquid of interest. Furthermore, the applied materials are vacuum compatible (for sample containers for gases, gas cells), hard and robust (should not bend when high pressures are applied—for sample containers for liquid), and/or insoluble materials (against water, acid and solvents).

According to an alternative embodiment of the invention, the spectroscopic apparatus 100 can be adapted for SRS measurements based on stimulated Raman scattering of the sample as described below with reference to FIGS. 9 and 10.

Figure 11:
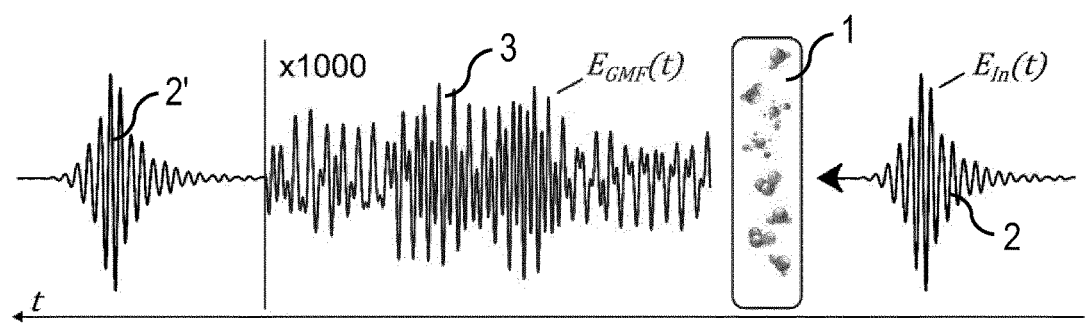
FIGS. 11 and 12: schematic illustrations of the conventional FRS technique (prior art).

In the following, measuring a sample response with the spectroscopic apparatus 100 of FIG. 1 is described. As outlined above, measuring the differential molecular fingerprint benefits from the coherent nature of the processes underlying field resolved spectroscopy as described in WO 2016/102056 A1: (i) the spatio-temporal coherence of electric field oscillations in the excitation wave, (ii) excitation of the molecular vibrations in the entire sample volume in a synchronized (coherent) fashion by the spatially and temporally coherent excitation wave, and (iii) re-emission of coherent radiation (sample wave 3, see FIG. 11) by excited molecules thanks to the perfect synchronism of their vibrations.

As a direct consequence of (i)-(iii), the electric field oscillations of the sample wave 3 are perfectly phase-locked to those of the excitation wave 2. As a result of this coherence, the sample wave 3 and reference wave 3A emerging from the sample and reference, $E_{GMF(sample)}(t)$, $E_{GMF(ref)}(t)$, excited by two replicas of one and the same excitation wave 2, $(E_{in}(t))$ simultaneously, can be directly compared with each other. In other words, the GMF from a sample of interest, $E_{GMF(sample)}(t)$, can be directly referenced to that of a reference fingerprint, $E_{GMF(ref)}(t)$, yielding—directly from a single measurement—the differential molecular fingerprint $\Delta E_{GMF}(t)$.

The preferred implementation of this fundamental concept by means of field-resolved infrared absorption spectroscopy consists of the following steps conducted with the setup of FIG. 1.

1) Separate the femtosecond mid-infrared (MIR) pulse (created by the MIR femtosecond conversion unit 13 in FIG. 1) into two equal parts with the 50/50 beamsplitter 14 (exact balancing may be achieved with an additional variable attenuator in one of the two beams after their splitting).

2) Send one of the MIR excitation pulse (excitation wave 2) through the reference sample 1A. Send the other—identical—MIR pulse through the sample 1 under investigation.

3) Recombine the two transmitted MIR pulses with the beam splitter 16 identical to that used for the splitting of the beam before the measurement (so that possible minor residual changes in waveform imposed by the beam splitter are cancelled upon passing through both input and output beam splitter). The setup described under 1)-3) forms the Mach-Zehnder interferometer 40, the two identical arms 42, 43 of which contain the sample 1 and the reference sample 1A (with both being arranged in geometries as identical as possible). As a consequence, the dispersion and attenuation of both sample 1/reference sample 1A and sample containers 51, 51A are identical except for changes in $E_{GMF}(t)$ caused by differences in molecular composition. 4) The beam propagation path length in the two interferometer arms 42, 43 preferably are set to be equal to within one half carrier wavelength of the excitation wave 2 (MIR pulse). By fine adjustments of the path length difference within plus/minus half wavelength, the two pulses incident on the output beam splitter 16 of the interferometer 40 can nearly perfectly cancel out each other, except for differences in their GMF waves rooted in differences in $E_{GMF}(t)$ between sample and reference due to their differing molecular composition.

5) Setting the path length difference such that it is minimized, results in near perfect mutual cancellation of the excitation pulses carrying approximately 99,9999% of the total radiation energy transmitted through and radiated from the samples. The remaining approx. 0,0001% of the energy is carried in the dMF signal 4 each. If the molecular composition of the sample 1 and the reference sample 1A were identical, the sample wave 3 and the reference wave 3A would be identical and they also perfectly cancelled out each other. If the molecular composition of the sample 1 and the reference sample 1A differ from each other, the sample wave 3 and the reference wave 3A do not perfectly cancel out but result in a difference yielding directly $\Delta E_{GMF}(t)$.

Figure 12:
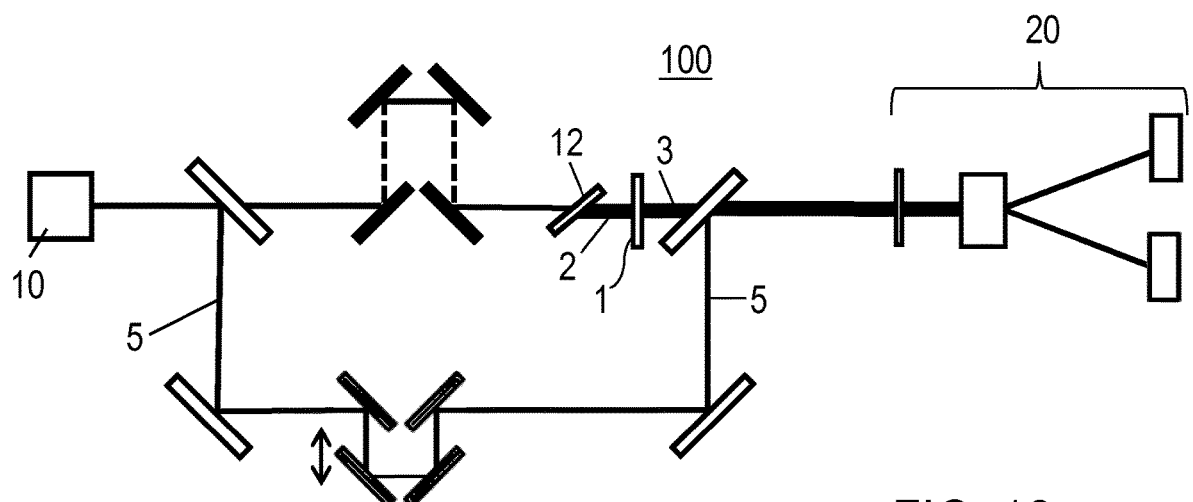

6) Sampling of the electric field of the amplified $\Delta E_{GMF}(t)$ signal 4A with the electro-optic sampling unit 23. This can be implemented by the same EOS system used for the conventional characterization of individual biomedical samples in FIG. 12. The differential molecular signal coming without the main pulse offers two significant benefits. First, the EOS crystal can be irradiated with a much higher electric field of the molecular signal, at which the (much stronger) excitation wave would irreversibly damage the crystal in the conventional scheme (FIG. 12). This directly results in a sensitivity increase in addition to that gained from the differential signal amplification. Second, the requirement to the dynamic range of the (digital) electronic system processing the EOS signal is largely relaxed. The system can be optimized for detection of the relevant molecular signal without having to deal with a much stronger accompanying signal.

7) Fourier transformation of the sampled temporal shape yields the spectral polarization response of the sample 1.

This can be further processed by the calculation device 30, e.g. for obtaining diagnostically relevant information. The spectral features of the polarization spectrum can be obtained by subjecting the polarization spectrum to a filtering process. Specific bands of compounds characteristic of the health status of a person can be identified. Furthermore, the polarization spectrum can be compared with data previously collected with the same organism and/or with reference data collected with other, healthy or non-healthy subjects.

(II) Dispersion Compensation of the Reference Wave

As noted above, the sensitivity of the GMF measurement can be increased if the GMF signal is efficiently separated from main pulse (this holds for both reference and sample waves). This is due to the background-free detection typical to field-resolved spectroscopy of WO 2016/102056 A1 compared to other spectroscopic techniques, described in the beginning of the present description. An extension of this advantage to the difference GMF can be obtained, if the fingerprint common to the reference and sample wave is confined to the shortest possible time window, by means of adjusting the chromatic dispersion of the participating waves accordingly. In this case, the difference GMF will appear in the sample wave (and in the dMF signal in the case of the dMF embodiment) predominantly at the end of the respective wave, maximizing its separation from the fingerprint common to the reference and sample waves.

According to this second embodiment of the invention, the adjustment of the participating waves includes the temporal separation of the difference GMF from the reference GMF within the sample wave by setting the chromatic dispersion in the beam path from the laser source device 10 to the detector device 20 for compressing the reference wave as illustrated in FIGS. 2 to 5. The temporal separation of the dMF wave from the reference GMF wave can be provided e.g. with the embodiment of FIG. 1, the SRS measurement of FIG. 9 or the conventional field resolved spectroscopy of FIG. 11.

The temporal separation of the difference GMF from the reference GMF within the sample wave preferably is obtained as schematically shown in FIGS. 2A to 2C and further exemplified in FIGS. 3A to 3F.

FIGS. 2A to 2C show the second embodiment of the invention without the interferometric set-up of FIG. 1. The illustrations refer to a variant of the inventive spectroscopic apparatus 100, including the laser source device 10 and the detector device 20, wherein only one single beam path of the excitation waves 2 is provided, in which the sample or the reference sample is placed and the difference of the sample waves and the reference waves 3A is detected by serial measurements of the sample and reference waves and subsequent calculation of the difference thereof. FIGS. 2A to 2C show the situation, wherein the reference sample 1A is placed in the beam path. The laser source device 10 comprises the components 11, 12 and 13 as noted above. The detector device 20 is adapted for electro-optic sampling of the sample or reference wave, using sampling pulses 5 from the NIR femtosecond source 11.

FIG. 2A shows the provision of a dispersion adjusting element 53 (optical adjustment device) placed after the sample 1. With the MIR femtosecond source 13, excitation waves 2 are created being compressed to the Fourier limit. By the reference sample 1A, in particular the wall material of the reference container 51A and the reference sample substance included in the reference container 51A, the reference main pulse and the reference wave are stretched. By the effect of the dispersion adjusting element 53, the reference wave 3A is well-compressed in time again. Accordingly, the sensitivity of sensing the dMF wave from the difference of the sample and reference waves is increased.

FIG. 2B shows the alternative case of providing the dispersion adjusting element 53 before the reference sample 1A, while FIG. 2C shows the same variant with the sample 1 in the beam path, instead of the reference sample. Again, the reference wave is well-compressed in time by the effect of the dispersion adjusting element 53. As a result, the temporal compression adjusted to the reference pulse leads to the dMF signal 4 appearing in the wake of the sample wave 3. It is noted that the variants of FIGS. 2A and 2B are equivalent if the interaction with the sample or reference sample is linear. Although in the case of SRS measurement they are not equivalent, still both of them can also be implemented for SRS.

For an optimized temporal compression of the reference wave, an active and programmable dispersion adjusting element 53 can be employed. Examples include acousto-optic programmable dispersive filter (or Dazzler) and spatial light modulators.

According to FIG. 3A, the excitation wave 2 generally is compressed along the beam path towards the detector device 20. This can be done by the effect of the optical adjustment device provided by the wall material of the sample container 51, as schematically shown in FIG. 3B, optionally in combination with the effect of reflective elements 52 introducing negative or positive dispersion before the reference container 51A (FIG. 3C) or after the reference container 51A (FIG. 3C), or exclusively by the reflective elements 52 introducing negative or positive dispersion before the reference container 51A (FIG. 3E) or after the reference container 51A (FIG. 3F). The same dispersion setting components are provided with the beam path including the sample container (not shown).

Figure 4:
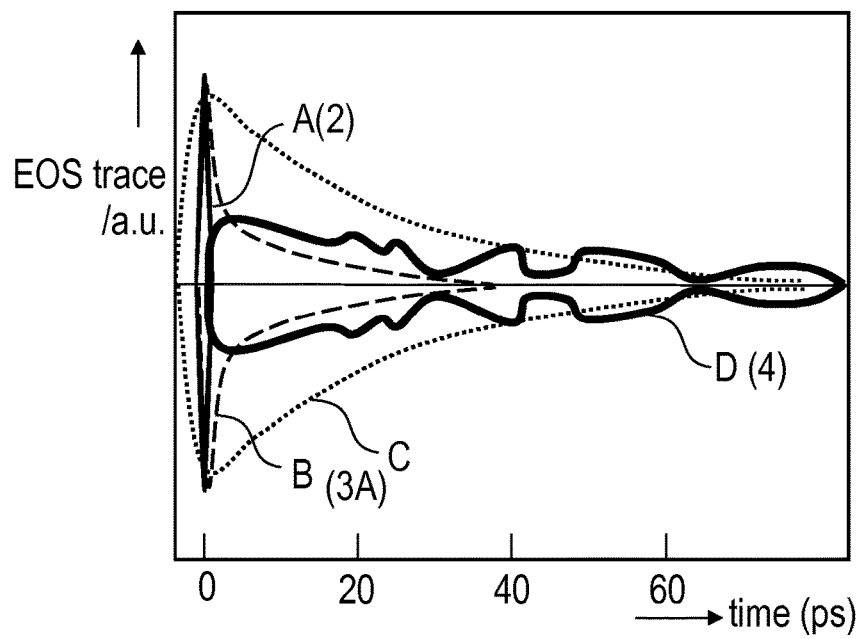
FIG. 4: a schematic graphical illustration of the temporal separation of the main pulse and GMF.

The separation effect of shortening the reference wave 3A is schematically shown in FIG. 4, wherein curve A shows e.g. a 74 fs fwhm bandwidth limited excitation wave 2, and curves B and C represent a pulse broadening in a conventional KCl sample container wall material (10 mm and 100 mm, resp). Curves B and C strongly overlap the sample GMF of curve D, thus deteriorating the detection of the dMF wave 4. With the compression of the reference wave 3A, this overlap is minimized or excluded.

For optimally compressing the reference wave 3A in time at the field-resolving detector, the following two cases can be distinguished:

Firstly, the exciting pulse is already perfectly compressed in time before entering the measurement section of the spectroscopic apparatus 100. This would mean that the components of the measurement section, like the sample container, mirrors or other optical components should not introduce any additional dispersion. This can be accomplished by the following three different design strategies.

Design 1: Combine any number of materials and negative and positive group velocity dispersion. Thereby the thickness of the individual materials is chosen in a way that the introduced dispersion of each material cancels out. The materials might also be used as windows for a liquid or gas cell in order to keep the sample of interest in place. Additional anti-reflection coatings can be applied to the windows in order to maximize transmission.

Figure 5:
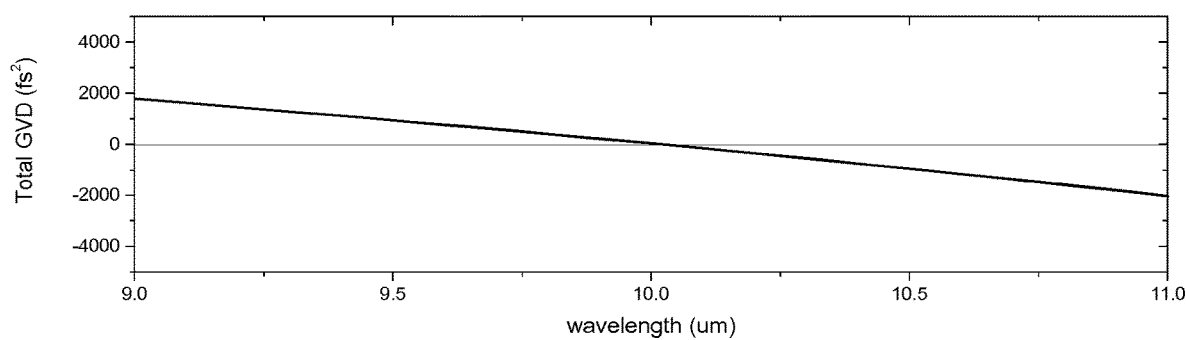
FIG. 5: a schematic graphical illustration of the dispersion compensation for shortening the main pulse.

An example for a measurement section based on Design 1, including a liquid cell sample container design for a well-compressed laser pulse in time with a central wavelength at 10 µm comprises two 5-mm Germanium windows as walls for the sample container and a 3-mm ZnSe plate coupled with one of the Germanium windows. The sample container is arranged under Brewster's angle for dispersion compensation. FIG. 5 shows the introduced group velocity dispersion over the bandwidth of interest. At 10 µm the total GVD is equal to 0.

Design 2: Minimize the total amount of dispersive material. This can be achieved by either minimizing the thickness of all transmission windows or dispense them completely by using freely streaming liquid jets of the liquid sample of interest. Thereby the produced liquid film should have optical surface quality in order to avoid beam distortion and unwanted losses. The liquid film can also be placed under Brewster's angle to maximize transmission. Liquid films with optical quality have already been demonstrated (see Tauber, M., et al. in "Review of Scientific Instruments" 74.11 (2003): 4958-4960).

Design 3: Introduce tailored and/or adjustable dispersive elements to compensate for introduced dispersion by window materials, optics and/or by components of the sample that are not of interest. Those additional dispersive elements could either be chirped mirrors, spatial light modulators (SLM) and/or an acousto-optic programmable dispersive filter (Dazzler).

Secondly, the exciting pulse is chirped before entering the measurement device. This would mean that the measurement device must compensate for this chirp to ensure a well compressed pulse in time at the field-resolved detector. Similar to case 1, slight variations of designs 1+3 are applicable to accomplish this.

Design 1: Combine any number of materials and negative and positive group velocity dispersion. Thereby the thickness of the individual materials is chosen in a way that the introduced dispersion of each material plus the chirp of the exciting pulse cancels out. The materials might also be used as windows for a liquid or gas cell in order to keep the sample of interest in place. Additional anti-reflection coatings can be applied to the windows in order to maximize transmission (requirement 2).

Design 2: Introduce tailored and/or adjustable dispersive elements to compensate for the chirp and introduced dispersion by window materials, optics and/or by components of the sample that are not of interest. Those additional dispersive elements could either be chirped mirrors, spatial light modulators (SLM) and/or an acousto-optic programmable dispersive filter (Dazzler). In general any combination of the above listed designs is adaptable to fulfill requirement 1+2 for the measurement device.

The materials of the container walls, thicknesses of the container walls and/or dispersion properties, e.g. of the reflective elements 52, can be selected on the basis of numerical simulations of the dispersion along the bam path towards the detector device 20. Sample container for samples in a liquid sample matrix may comprise e.g. Ge walls with a ZnSe plate for dispersion control (having advantages in terms of high transmission and effective compression), Si walls with a ZnSe plate for dispersion control, or Thalliumbromidiodide (KRS-5) walls with a Ge plate. Sample container for gaseous samples without a sample matrix may comprise e.g. Ge walls with a ZnSe plate for dispersion control, KI, Rbl or Csl walls, or KBr, RBr or CBr walls.

(III) Optimization of the Interaction Geometry

A further approach for obtaining an optimal access to the sample GMF and/or the difference GMF and efficiently use the background-free detection characteristic to FRS comprises maximizing the sample GMF wave by optimizing the interaction length with the sample of interest, as described in the following.

The optimum interaction length l with the sample of interest, in the case of a strongly absorbing reference, is $$l = \frac{2}{\alpha}$$

wherein $\alpha$ is the absorption coefficient of the reference sample.

The optimum interaction length l is obtained by minimizing the relative error $s_\alpha$ of the retrieval for a given thickness x and field dynamic range $DR_E$:

$$s_\alpha = \frac{2}{x} * \frac{1}{DR_E} * e^{\frac{x\alpha}{2}}$$

The thickness range for which the relative error doesn't deviate more than a factor 10 compared to the optimum value yields:

$$10 * s_{opt} = \frac{2}{x} * \frac{1}{DR_E} * e^{\frac{x\alpha}{2}}$$
$$10 * \alpha \frac{1}{DR_E} * e^1 = \frac{2}{x} * \frac{1}{DR_E} * e^{\frac{x\alpha}{2}}$$
$$10 * \alpha * e^1 = \frac{2}{x} * e^{\frac{x\alpha}{2}}$$

The solution of this equation is:

$$x_1 = \frac{2W\left(-\frac{1}{10e}\right)}{\alpha} \approx \frac{0.076}{\alpha} \approx \frac{x_{opt}}{25}$$

$$x_1 = \frac{2W_{-1}\left(-\frac{1}{10e}\right)}{\alpha} \approx \frac{9.78}{\alpha} \approx 5 * x_{opt}$$

Thereby W(x) is product log function.

Thus, an optimum interaction length l in a range from $l=2/25\alpha$, to $l=10/\alpha$ is obtained. With more details, the optimum interaction length $$l = \frac{2}{\alpha}$$

is obtained on the basis of the following considerations. An example of a sample in an absorbing sample matrix (which constitutes the reference sample) is constituted by low-concentration solutions of a molecular species in a strongly absorbing liquid. Let $\alpha_1$ be the absorbance of a strongly absorbing buffer substance and $\alpha_2$ that of the low-concentration solved molecular species under test. Then, the intensity of a certain spectral element is given by:

$$I_S = I_0 e^{-\alpha_1 x} e^{-\alpha_{is} x}, \quad (1)$$

and the "reference" intensity can be considered $I_R := I_0 e^{-\alpha_1 x}$. Since electric fields are measured, eq. (1) can be written as:

$$|E_S| = |E_R| e^{\frac{-\alpha_2 x}{2}}. \quad (2)$$

Assuming a detector-noise limited sensitivity (as it is the case if the reference pulse is so short that it can be efficiently excluded from the time window of the measurement without losing significant information on the GMF and if the coupling of intensity and phase noise via absorbers in other spectral elements is negligible) and the condition for the minimum detectable absorption loss (MDAL) reads:

$$|E_R| - |E_S| > NEP_{E,att}, \quad (3)$$

where $NEP_{E,att}$ is the noise-equivalent power in the respective spectral element, after attenuation through the medium with $\alpha_1$:

$$1 - e^{\frac{-\alpha_2 x}{2}} > \frac{1}{DR_{E,att}}. \quad (4)$$

Approximating $$e^{\frac{-\alpha_2 x}{2}}$$

by $$1 - \frac{\alpha_2 x}{2}$$

and writing $$DR_{E,att} = DR_E e^{\frac{-\alpha_1 x}{2}} \text{ yields:} \quad (5)$$

$$\alpha_2 x > \frac{2}{DR_E e^{\frac{-\alpha_1 x}{2}}}.$$

Thus, the MDAL in $\alpha_2$ is reached when the function $$f(x) = \frac{e^{\frac{\alpha_1 x}{2}}}{x} \quad (6)$$

reaches a minimum. To find this value the first derivative is computed and set to 0:

$$e^{\frac{\alpha_1 x}{2}} \left( -\frac{1}{x^2} + \frac{1}{x} \cdot \frac{\alpha_1}{2} \right) = 0.$$

The solution is $x = 2/\alpha_1$.

For example, considering water as the buffer substance with $\alpha_1 = 600$ cm$^{-1}$ at 9.6 μm an optimum liquid cell thickness of 33 μm is obtained. Assuming a dynamic range of the electric field measurement of $10^5$, from eq. (5) an MDAL of $\alpha_2 = 0.0163$ cm$^{-1}$ is derived.

(IV) Optical Amplification of the Sample Wave

The difference GMF (the difference of the electric fields of the GMF wave emitted by the sample 1 and the reference sample 1A, see FIG. 1) may be extremely weak. Hence, before being measured by electro-optic sampling (or some alternative field sampling technique), its amplification would be desirable. According to FIGS. 6 and 7, optical parametric amplification (OPA) is used for this purpose. Efficient OPA requires matching of the phase velocities of all three waves involved in the process, the pump wave driving the amplification process, and the signal and idler waves being amplified: $k_p=k_s+k_i$ (with the attributes "signal" and "idler" being traditionally connected to the higher- and lower-frequency amplified waves). If the wave to be amplified by OPA possesses a super-octave bandwidth, this wave preferably is the lowest-frequency "idler" wave in order that the above phase matching condition can be reasonably well fulfilled over its entire bandwidth, which is a prerequisite for efficient amplification without distortion of the amplified wave. If this phase matching condition is fulfilled and only the pump wave and the wave to be amplified (idler) overlap in the OPA crystal, the latter wave will (asymptotically) experience an exponential growth.

$$A_i(z) \propto A_i(01)e^{gz}$$

where $A_i$ is the amplitude of the molecular signal (idler wave) upon propagation along the z direction in the OPA crystal and g is the OPA gain coefficient proportional to the amplitude of the pump wave. A major shortcoming of this simplest implementation of OPA is that if the amplitude of the input signal $A_i(0)$ is very low it may not sufficiently exceed that of the radiation emerging spontaneously in the amplifier medium to dominate over this background noise. If so, the amplified output would be plagued by intolerable noise. As the present sample wave 3 to be amplified indeed may be very weak, the latter problem can be elegantly and efficiently circumvented by driving the OPA process not merely with a pump wave but, simultaneously, with a signal wave of input amplitude $A_s(0)$, which can be easily several orders of magnitude stronger than the amplitude of the molecular signal, $MO)>>A_i(0)$. Under these conditions, assuming again perfect phase matching, $$A_i(z) \propto A_i(01)e^{gz}$$

is obtained.

A comparison of the above relationships yields that the amplitude of the amplified molecular signal in this latter case is enhanced by $$G = \frac{A_s(0)}{A_i(0)}$$

G can be easily as large as $10^3$–$10^5$, depending on the initial amplitude of the molecular wave.

Hence, amplification of the differential molecular signal should be implemented with a pump-signal-driven OPA. This is particularly straightforward if the mid-infrared wave used for illuminating the molecular systems is generated from the same process. In this case, the pump and signal waves leaving the OPA system can be directly recycled for the above purpose.

Figure 6:
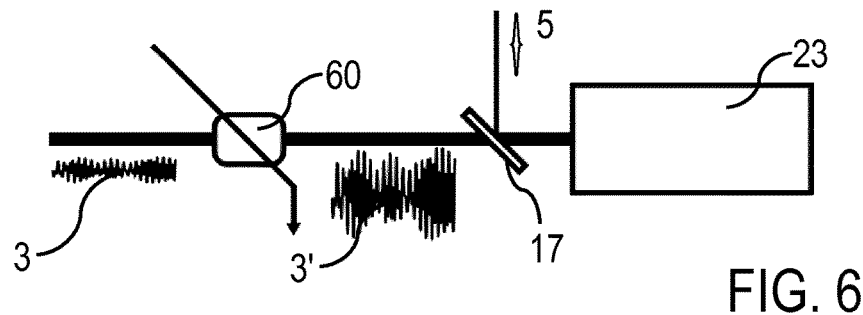
FIGS. 6 and 7: schematic illustrations of amplifying sample waves using a parametric optical amplifier according to the third embodiment of the invention.
Figure 7:
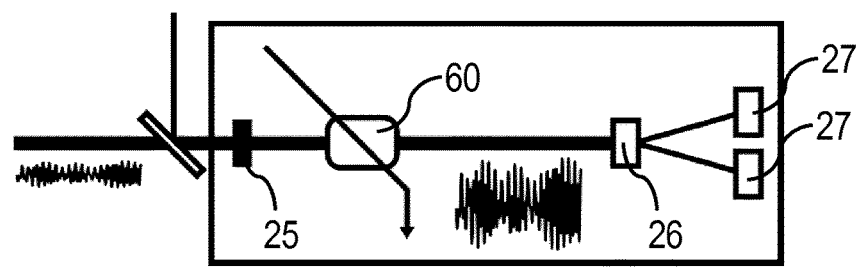

This amplification principle is illustrated in FIG. 6 showing further details of the setup of FIG. 1 and in FIG. 7 showing an alternative embodiment, wherein the amplification is included in the detection device 20. According to FIG. 6, the sample wave 3 (beam of MIR pulses after interaction with sample) is sent to the optical parametric amplification device 60. The amplified sample wave 3' is combined with the sampling pulses 5 via the MIR-NIR beam combiner 17 and sent to the electro-optic sampling unit 23, which includes an electro-optical crystal 25, a Wollaston prism 26 and balanced detectors 27 (as shown in FIGS. 7 and 12). In the electro-optic sampling unit 23, the electro-optical detection is conducted with optical amplification of the sum-frequency generated (SFG) signal in the electro-optical crystal 25. The SFG signal carries the actual information of the MIR signal (molecular fingerprint signal). According to FIG. 7, the optical parametric amplification device 60 is included in the electro-optic sampling unit 23.

Figure 8:
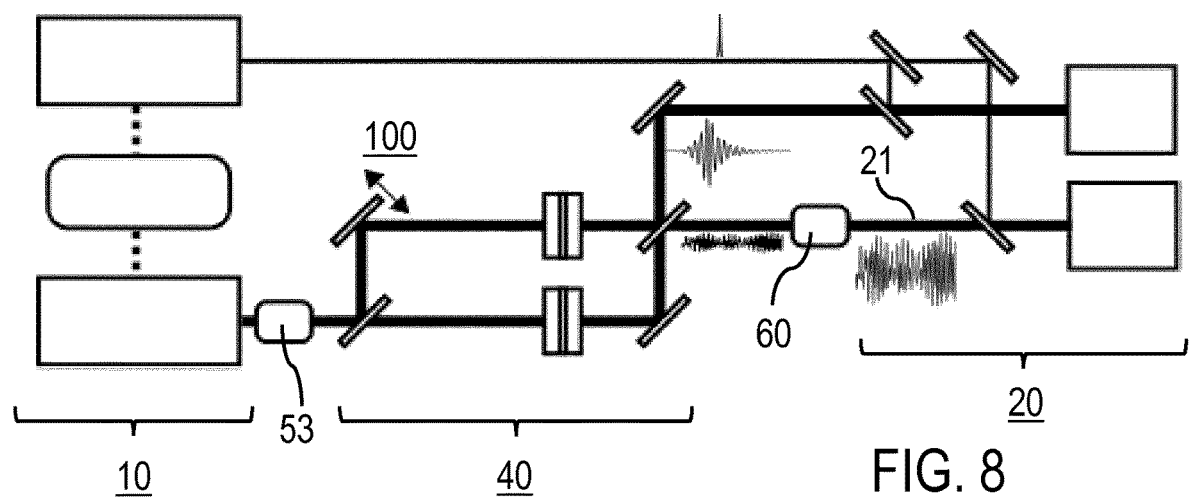
FIG. 8: a schematic illustration of a spectroscopic apparatus combining the first to third embodiments of the invention.

FIG. 8 illustrates a variant of the spectroscopic apparatus 100 combining the interferometric set-up (embodiment I) of FIG. 1 with the dispersion setting (embodiment II) and the optical amplification (embodiment IV). In this case, the dispersion adjusting element 53 is placed before the interferometer 40, and the optical parametric amplification device 60 is placed in the first detector channel 21.

(V) SRS Embodiment of the Spectroscopic Apparatus

According to an embodiment of the invention, FRS spectroscopy is used for SRS measurements. FIG. 9 shows an example of an SRS measurement. It is noted that the implementation of the invention is not restricted to this particular set-up but alternatively possible with modified variants, in particular with regard to the provision of the pump and Stokes pulses and the serial (as shown) or parallel (analogue to FIG. 1) measurement of the reference sample.

Figure 9:
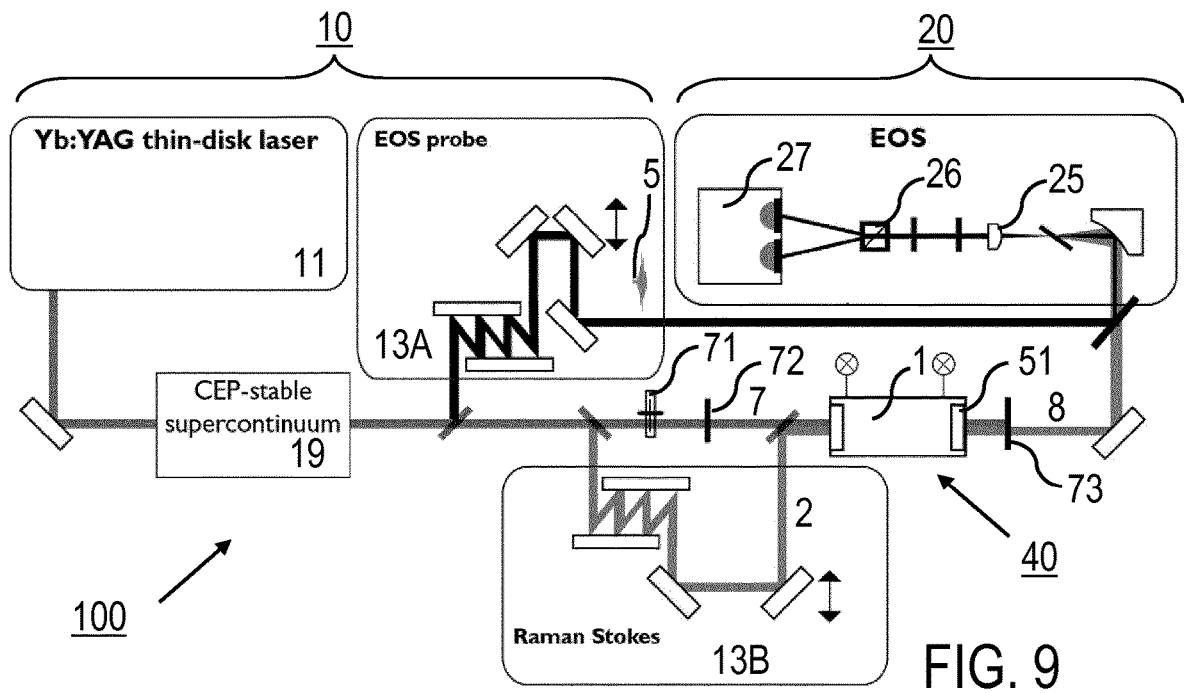
FIGS. 9 and 10: schematic illustrations of a spectroscopic apparatus according to the SRS embodiment of the invention.
Figure 10:
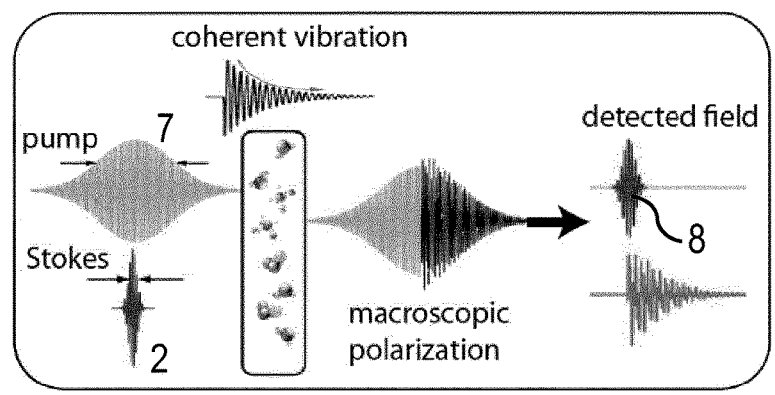

According to FIG. 9, the spectroscopic apparatus 100 for SRS measurements comprises the laser pulse source 10, the detector device 20, and dispersion setting components for the temporal compression of the reference wave (embodied by the design of the wall material of the sample container 51 or reference container 51A, not shown). The calculation device for calculating the spectral response of the sample (see FIG. 1) is not shown in FIG. 9. The illustrated embodiment of the spectroscopic apparatus 100 is adapted for the temporal separation of the sample wave from the reference wave. According to an alternative embodiment of the invention, the spectroscopic apparatus 100 of FIG. 10 can be adapted for an interferometric separation of the sample wave from the excitation wave, e.g. according to FIG. 1 or 8.

The laser pulse source 10 includes a femtosecond source 11, like a Yb:YAG thin disk laser creating driving pulses e.g. with an output energy of 30 µJ, a repetition rate of 11 MHz, a centre wavelength of 1030 nm and a pulse duration of 500 fs (see D. Bauer et al. in "Opt. Express" 20.9, p. 9698., 2012; and J. Brons et al. in "Opt. Lett." 41.15, p. 3567, 2016; and H. Fattahi et al. in "Opt. Express" 24.21, pp. 24337-24346, 2016). After generation, the driving pulses are compressed to their Fourier transform limit. Temporal confinement of the pulses to about 20 fs allows for detection of molecular free induction decay (FID) with a higher sensitivity and signal-to-noise ratio. A femtosecond conversion unit 19 is provided for creating, based on the driving pulses, a CEP stable supercontinuum with a spectrum from 450 nm to 2000 nm. The femtosecond conversion unit 19 comprises e.g. white light generation in a bulk material such as quartz. A portion of the femtosecond conversion unit 12 output is deflected to the first compression and delay unit 13A, including a chirped mirror compressor and a delay unit, for providing a sequence of sampling pulses 5 for the electro-optic sampling with the detector device 20.

For the electric field-detection of stimulated Raman scattering, the sample 1 is simultaneously irradiated with a sequence of e.g. narrowband pump pulses 7 and broadband Stokes pulses 2 (see FIG. 10) both being created on the basis of the output from the femtosecond conversion unit 12. The excitation wave is represented by the broadband Stokes pulses 2 supplied to the sample 1 via the second compression and delay unit 13B. The narrowband pump pulses 7 are created with an acousto-optical modulator 71 (modulating at a MHz frequency) and an ethalon 72, e.g. with a center wavelength of 1030 nm and a pulse duration of 1 ps. After the interaction with the sample 1, the modified probe light comprises the pump pulses and the Stokes pulses 8 enhanced by a vibrational Raman response of the sample 1. Before electro-optic sampling with the detection device 20, the enhanced Stokes pulses 8 pass a long pass filter 73 (e.g. 1050 nm) suppressing the pump light. The enhanced Stokes pulses 8 represent the sample wave 3 described above. For implementing the dMF measurement, the sample 1 is replaced by a reference sample and a reference wave is detected, including enhanced Stoke pulses excited in the reference sample.

The detector device 20 for electro-optic sampling is designed as described above. The sampling pulses 5 provided by the first compression and delay unit 13A are superimposed with the sample waves, e.g. the enhanced Stokes pulses 8, and both are simultaneously transmitted via the electro-optical crystal 25 (e.g. BBO crystal), a 700 nm short pass filter and a λ/4 plate, the Wollaston prism 26 to the balanced detectors 27.

With an alternative embodiment, broadband pump pulses and narrowband Stokes pulses are created and the excitation wave comprises the narrowband Stokes pulses, wherein the probe light comprises the broadband pump pulses and the modified probe light comprises the pump pulses diminished by a vibrational Raman response of the sample. According to another alternative embodiment, the spectroscopic apparatus 100 of FIG. 9 can be adapted for an interferometric separation of the sample wave (enhanced Stokes pulses 8) from the reference wave, e.g. according to FIG. 1. In particular, the Mach Zehnder interferometer of FIG. 1 can be provided, including the sample 1 in a first interferometer arm and a reference sample in a second interferometer arm. The pump and Stokes pulses are split into both of the first and second interferometer arms.

The field-detection of Stokes pulses according to FIG. 9 represents a novel femtosecond SRS scheme. The increased sensitivity in this embodiment of the invention is due to the confinement of the excitation Stokes pulses in a few femtosecond (fs) temporal window. The Stokes gain can be resolved in picoseconds time frame starting from hundreds of fs, and outside the temporal window of the excitation pulses. As the molecular response decay exponentially over time, the background free measurement allows for higher sensitivity.

In fs SRS the simultaneous interaction of a narrow-bandwidth ps Raman pump pulse 7 and a broadband, few-cycle Stokes pulse 2, creates a macroscopic polarization in the sample. The narrow bandwidth of the pump pulses 7 provides the high spectral resolution required for resolving molecular fingerprint. During the process sharp vibrational gain features appear on top of the Stokes envelope and equivalently an exponential decay of the order of hundreds of ps in the time domain. The process is shown in FIG. 10. The Stokes pulse initiates vibrational coherence of molecules in the sample, which are decaying with their vibrational dephasing time $\tau_{vib}$. This finite duration of the vibrational coherence result in a limited bandwidth in the frequency domain and the induced coherent vibrational motion modulates the macroscopic polarization at the vibration frequency (Kukura, P. et al. in "Annu. Rev. Phys. Chem." 58.1, pp. 461-488, 2007). The entire fingerprint region of a sample can be detected by measuring the enhanced Stokes pulses 3 in the time domain.

The features of the invention disclosed in the above description, the drawings and the claims can be of significance individually, in combination or sub-combination for the implementation of the invention in its different embodiments.

The invention claimed is:

1. A method of measuring a polarization response of a sample, said polarization response being induced by periodic oscillations of charges within the sample around equilibrium positions of the charges in response to an irradiation with excitation waves, said method comprising the steps of
generating a sequence of the excitation waves as a train of laser pulses,
irradiating the sample with the sequence of the excitation waves, including an interaction of the excitation waves with the sample to cause the periodic oscillations of charges within the sample around the equilibrium positions of the charges, so that a sequence of sample waves is generated each including a superposition of a sample main pulse and a sample global molecular fingerprint (GMF) wave ($E_{GMF(sample)}(t)$),
irradiating a reference sample with the sequence of the excitation waves, including an interaction of the excitation waves with the reference sample to cause periodic oscillations of charges within the reference sample around equilibrium positions of the charges, so that a sequence of reference waves is generated each including a superposition of a reference main pulse and a reference GMF wave ($E_{GMF(ref)}(t)$),
optically separating a difference of the sample waves and reference waves from GMF wave contributions which are common to both of the sample waves and reference waves in at least one of space and time, and
detecting the difference of the sample waves and the reference waves and determining a temporal amplitude function of differential molecular fingerprint (dMF) waves ($\Delta E_{GMF}$) each comprising the difference of the sample and reference GMF waves and representing the polarization response to be measured.

2. The method according to claim 1, wherein
the optically separating step includes an interferometric combination of the sample and reference waves, resulting in an interferometric cancellation of the sample and reference main pulses and the GMF wave contributions included in both of the sample and reference GMF waves.

3. The method according to claim 2, wherein the interferometric cancellation is obtained using a Mach-Zehnder interferometer, wherein
the excitation waves are input at a first input port of the Mach-Zehnder interferometer,
the sample to be investigated is arranged in a first interferometer arm of the Mach-Zehnder interferometer,
the reference sample is arranged in a second interferometer arm of the Mach-Zehnder interferometer, and
the dMF waves are provided at a first output port of the Mach-Zehnder interferometer.

4. The method according to claim 3, wherein
beam propagation path lengths in the first and second interferometer arms are set equal within one half carrier wavelength of the excitation waves.

5. The method according to claim 1, wherein
the optically separating step includes setting a group delay dispersion in beam paths including the sample and the reference sample such that the reference waves are shortened towards the Fourier transform limit thereof.

6. The method according to claim 5, wherein
the step of setting the group delay dispersion includes shortening the reference main pulses and shortening the GMF wave contributions included in both of the sample and reference GMF waves.

7. The method according to claim 5, further comprising generating the excitation waves with a Fourier transform limit pulse duration, and
subjecting at least one of the excitation waves and the sample and reference main pulses to a dispersion compensation reducing a pulse stretching effect of any substance along the beam paths.

8. The method according to claim 7, wherein the dispersion compensation is obtained by at least one of
providing a sample container of the sample and a reference container of the reference sample with container wall material having negative or positive dispersion, and
applying negative or positive dispersion by reflective elements before and/or after the sample and the reference sample.

9. The method according to claim 5, comprising generating the excitation waves with a pulse chirp such that the dispersion introduced along the beam paths compensates the pulse chirp.

10. The method according to claim 9, wherein a pulse chirp compensation is obtained by at least one of
providing a sample container of the sample and a reference container of the reference sample with container wall material having a dispersion, which cancels out the pulse chirp, and
applying dispersion by reflective elements arranged at least one of before and after the sample and the reference sample such that the pulse chirp is cancelled out.

11. The method according to claim 1, further comprising maximizing probe light transmission through the sample and the reference sample by at least one of providing an antireflection coating on a sample container of the sample and a reference container of the reference sample and placing the sample and the reference sample under the Brewster angle relative to the excitation wave beam paths.

12. The method according to claim 1, wherein
the sample and the reference sample include liquid or solid substances, and
an interaction length (l) of the excitation waves within the sample and the reference sample is set in a range from $l=2/25\alpha$, to $l=10/\alpha$, wherein $\alpha$ is an absorption coefficient of the reference sample.

13. The method according to claim 1, including a step of optical amplification of at least one of the sample waves and the reference waves, and the dMF waves.

14. The method according to claim 13, wherein
the optical amplification includes a pump-signal-driven optical parametric amplification.

15. The method according to claim 1, further comprising detecting of stimulated Raman scattering at the sample and the reference sample, wherein
the sample is simultaneously irradiated with a sequence of narrowband pump pulses and broadband Stokes pulses or alternatively broadband pump pulses and narrowband Stokes pulses,
the excitation waves comprise the broadband Stokes pulses or alternatively the broadband pump pulses, and
the sample GMF waves and the reference GMF waves comprise enhanced Stokes pulses enhanced by a vibrational Raman response of the sample and the reference sample or alternatively the pump pulses diminished by a vibrational Raman response of the sample and the reference sample.

16. The method according to claim 1, wherein the excitation wave has a pulse duration equal to or below 1 ps.

17. The method according to claim 1, wherein
a dMF wave is detected by electro-optic sampling or by photo-conductive sampling.

18. A method of measuring a polarization response of a sample, said polarization response being induced by periodic oscillations of charges within the sample around equilibrium positions of the charges in response to an irradiation with excitation waves said method comprising the steps of
generating a sequence of the excitation waves as a train of laser pulses,
irradiating the sample with the sequence of the excitation waves, including an interaction of the excitation waves with the sample to cause the periodic oscillations of charges within the sample around the equilibrium positions of the charges, so that a sequence of sample waves is generated each including a superposition of a sample main pulse and a sample global molecular fingerprint (GMF) wave ($E_{GMF(sample)}(t)$),
irradiating a reference sample with the sequence of excitation waves, including an interaction of the excitation waves with the reference sample to cause periodic oscillations of charges within the reference sample around equilibrium positions of the charges, so that a sequence of reference waves is generated each including a superposition of a reference main pulse and a reference GMF wave ($E_{GMF(ref)}(t)$), and
detecting a difference of the sample waves and the reference waves and determining a temporal amplitude function of differential molecular fingerprint (dMF) waves ($\Delta E_{GMF}$) each comprising the difference of the sample and reference GMF waves and representing the polarization response to be measured, wherein
at least one of the sample waves and the reference waves and the dMF waves are optically amplified.

19. The method according to claim 18, wherein
the optical amplification includes a pump-signal-driven optical parametric amplification.

20. A spectroscopic apparatus for measuring a polarization response of a sample, said polarization response being induced by periodic oscillations of charges within the sample around equilibrium positions of the charges in response to an irradiation with excitation waves, said spectroscopic apparatus comprising
a laser source device being configured for generating a sequence of the excitation waves as a train of laser pulses and for irradiating the sample with the sequence of the excitation waves, including an interaction of the excitation waves with the sample to cause the periodic oscillations of charges within the sample around the equilibrium positions of the charges, so that a sequence of sample waves is generated each including a superposition of a sample main pulse and a sample global molecular fingerprint (GMF) wave ($E_{GMF(sample)}(t)$), and for irradiating a reference sample with the sequence of the excitation waves, including an interaction of the excitation waves with the reference sample to cause periodic oscillations of charges within the reference sample around equilibrium positions of the charges, so that a sequence of reference waves is generated each including a superposition of a reference main pulse and a reference GMF wave ($E_{GMF(ref)}(t)$), at least one optical adjustment device being arranged for optically separating a difference of the sample waves and reference waves from wave contributions which are common to both of the sample waves and reference waves in at least one of space and time, and a detector device being arranged for detecting the difference of the sample waves and the reference waves and determining a temporal amplitude function of differential molecular fingerprint (dMF) waves ($\Delta E_{GMF}$) each comprising the difference of the sample and reference GMF waves and representing polarization response to be measured.

21. The spectroscopic apparatus according to claim 20, wherein the at least one optical adjustment device comprises a Mach-Zehnder interferometer, which is configured such that the sequence of excitation waves is input at a first input port of the Mach-Zehnder interferometer, the sample to be investigated is arranged in a first interferometer arm of the Mach-Zehnder interferometer, the reference sample is arranged in a second interferometer arm of the Mach-Zehnder interferometer, and the dMF waves are provided at a first output of the Mach-Zehnder interferometer.

22. The spectroscopic apparatus according to claim 21, wherein beam propagation path lengths in the first and second interferometer arms are set equal within one half carrier wavelength of the excitation wave.

23. The spectroscopic apparatus according to claim 20, wherein the at least one optical adjustment device is configured for selecting a group delay dispersion in beam paths including the sample and the reference sample such that the reference waves are shortened towards a Fourier transform limit thereof.

24. The spectroscopic apparatus according to claim 23, wherein the laser source device is configured for generating the excitation wave with a Fourier transform limit pulse duration, and group delay dispersion in beam paths including the sample and the reference sample is selected such that a pulse stretching effect of any substance along the beam paths is reduced.

25. The spectroscopic apparatus according to claim 24, wherein a sample container of the sample and a reference container of the reference sample have a container wall material with negative or positive dispersion.

26. The spectroscopic apparatus according to claim 23, wherein the laser source device is configured for generating the excitation waves with a pulse chirp such that the dispersion introduced along the beam paths compensates the pulse chirp.

27. The spectroscopic apparatus according to claim 26, wherein a sample container of the sample and a reference container of the reference sample has a container wall material with a dispersion, which cancels out the pulse chirp.

28. The spectroscopic apparatus according to claim 20, wherein an antireflection coating is provided on a sample container of the sample and a reference container of the reference sample.

29. The spectroscopic apparatus according to claim 20, wherein the sample and the reference sample include liquid or solid substances, and an interaction length (l) of the excitation waves within the sample and the reference sample is set in a range from $l=2/25\alpha$, to $l=10/\alpha$, wherein $\alpha$ is an absorption coefficient of the reference sample.

30. The spectroscopic apparatus according to claim 20, further comprising an optical amplification device being configured for an optical amplification of the sample waves and the reference waves, or of the dMF waves.

31. The spectroscopic apparatus according to claim 30, wherein the optical amplification device is a pump-signal-driven optical parametric amplification device.

32. The spectroscopic apparatus according to claim 20, being configured for detecting stimulated Raman scattering at the sample, wherein the laser source device is configured for simultaneously irradiating the sample with a sequence of narrowband pump pulses and broadband Stokes pulses or alternatively broadband pump pulses and narrowband Stokes pulses, the excitation waves comprise the broadband Stokes pulses or alternatively the broadband pump pulses, and the sample GMF waves and the reference GMF waves comprise enhanced Stokes pulses enhanced by a vibrational Raman response of the sample and the reference sample or alternatively the pump pulses diminished by a vibrational Raman response of the sample and the reference sample.

33. The spectroscopic apparatus according to claim 20, wherein the laser source device is configured for creating the excitation wave having a pulse duration equal to or below 1 ps.

34. The spectroscopic apparatus according to claim 20, wherein the detector device is configured for detecting the dMF wave by electro-optic sampling or by photo-conductive sampling.

35. A spectroscopic apparatus for measuring a polarization response of a sample, said polarization response being induced by periodic oscillations of charges within the sample around equilibrium positions of the charges in response to an irradiation with excitation waves said spectroscopic apparatus comprising a laser source device being configured for generating a sequence of the excitation waves as a train of laser pulses and for irradiating the sample with the sequence of the excitation waves, including an interaction of the excitation waves with the sample to cause the periodic oscillation of charges within the sample around the equilibrium positions of the charges, so that a sequence of sample waves is generated each including a superposition of a sample main pulse and a sample global molecular fingerprint (GMF) wave ($E_{GMF(sample)}(t)$), and for irradiating a reference sample with the sequence of the excitation waves, including an interaction of the excitation waves with the reference sample to cause periodic oscillations of charges within the reference sample around equilibrium positions of the charges, so that a sequence of reference waves is generated each including a superposition of a reference main pulse and a reference GMF wave ($E_{GMF(ref)}(t)$), a detector device being arranged for detecting a difference of the sample waves and the reference waves, wherein a temporal amplitude function of differential molecular fingerprint (dMF) waves ($\Delta E_{GMF}$) is determined each comprising the difference of the sample and reference GMF waves and representing the polarization response to be measured, and an optical amplification device being configured for an optical amplification of at least one of the sample waves and the reference waves and the dMF waves.

36. The spectroscopic apparatus according to claim 35, wherein the optical amplification device is a pump-signal-driven optical parametric amplification device.

37. The spectroscopic apparatus according to claim 20, wherein the spectroscopic apparatus is configured for measuring a polarization response of a biological sample.

38. The method according to claim 1, wherein said sample is a biological sample.

39. The method according to claim 18, wherein said sample is a biological sample.

40. The spectroscopic apparatus according to claim 24, wherein reflective elements configured for applying negative or positive dispersion are arranged at least one of before and after the sample and the reference sample.

41. The spectroscopic apparatus according to claim 27, wherein reflective elements configured for applying dispersion are arranged at least one of before and after the sample and the reference sample such that the pulse chirp is cancelled out.

42. The spectroscopic apparatus according to claim 20, wherein the sample and the reference sample are placed under the Brewster angle relative to the excitation wave beam paths.

* * * * *